United States Patent
Bui et al.

(10) Patent No.: US 11,100,917 B2
(45) Date of Patent: Aug. 24, 2021

(54) GENERATING GROUND TRUTH ANNOTATIONS CORRESPONDING TO DIGITAL IMAGE EDITING DIALOGUES FOR TRAINING STATE TRACKING MODELS

(71) Applicant: Adobe Inc., San Jose, CA (US)

(72) Inventors: Trung Bui, San Jose, CA (US); Zahra Rahimi, Pittsburgh, PA (US); Yinglan Ma, Mountain View, CA (US); Seokhwan Kim, San Jose, CA (US); Franck Dernoncourt, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/366,904

(22) Filed: Mar. 27, 2019

(65) Prior Publication Data
US 2020/0312298 A1 Oct. 1, 2020

(51) Int. Cl.
*G10L 15/06* (2013.01)
*G06F 3/16* (2006.01)
(Continued)

(52) U.S. Cl.
CPC .......... *G10L 15/063* (2013.01); *G06F 3/0482* (2013.01); *G06F 3/04845* (2013.01);
(Continued)

(58) Field of Classification Search
CPC ...... G06F 3/0482; G06F 3/0484; G06F 17/30; G06F 3/017; G06F 30/27; G06F 2221/0724; G06F 2221/0768; G06F 3/167; G06F 3/04845; G06F 40/169; G06T 15/205; G06T 7/20; G06K 9/3241; G06K 9/46;
(Continued)

(56) References Cited

U.S. PATENT DOCUMENTS 7,092,888 B1 * 8/2006 McCarthy ............. G10L 15/063
379/88.01
10,297,070 B1 * 5/2019 Zhu ....................... G06K 9/6268
(Continued)

OTHER PUBLICATIONS

Jacqueline Brixey, Ramesh Manuvinakurike, Nham Le, Tuan Lai, Walter Chang, Trung Bui; "A System for Automated Image Editing from Natural Language Commands;" Submitted on Dec. 3, 2018; Cornell University, arXiv:1812.01083 [cs.CL].
(Continued)

*Primary Examiner* — Steven P Sax
(74) *Attorney, Agent, or Firm* — Keller Jolley Preece

(57) ABSTRACT

The present disclosure relates to systems, non-transitory computer-readable media, and methods that generate ground truth annotations of target utterances in digital image editing dialogues in order to create a state-driven training data set. In particular, in one or more embodiments, the disclosed systems utilize machine and user defined tags, machine learning model predictions, and user input to generate a ground truth annotation that includes frame information in addition to intent, attribute, object, and/or location information. In at least one embodiment, the disclosed systems generate ground truth annotations in conformance with an annotation ontology that results in fast and accurate digital image editing dialogue annotation.

20 Claims, 19 Drawing Sheets

(51) Int. Cl.
   *G06F 3/0482* (2013.01)
   *G06N 20/00* (2019.01)
   *G10L 15/22* (2006.01)
   *G10L 15/18* (2013.01)
   *G06F 3/0484* (2013.01)
   *G06F 40/169* (2020.01)

(52) U.S. Cl.
   CPC ............ *G06F 3/167* (2013.01); *G06F 40/169* (2020.01); *G06N 20/00* (2019.01); *G10L 15/1815* (2013.01); *G10L 15/22* (2013.01)

(58) Field of Classification Search
   CPC ...... G06N 99/005; G06N 20/00; G16H 30/20; G10L 15/063; G10L 15/22; G10L 15/1815
   See application file for complete search history.

(56) References Cited

U.S. PATENT DOCUMENTS

| | | | | |
|---|---|---|---|---|
| 10,339,598 | B1* | 7/2019 | Karpan | G06Q 30/0643 |
| 2005/0288931 | A1* | 12/2005 | Kaneko | G10L 15/193 |
| | | | | 704/257 |
| 2013/0335405 | A1* | 12/2013 | Scavezze | A63F 13/40 |
| | | | | 345/419 |
| 2015/0371422 | A1* | 12/2015 | Kokemohr | G06T 5/00 |
| | | | | 382/311 |
| 2016/0064002 | A1* | 3/2016 | Kim | G10L 15/22 |
| | | | | 704/246 |
| 2016/0127641 | A1* | 5/2016 | Gove | G01B 11/00 |
| | | | | 348/143 |
| 2016/0147840 | A1* | 5/2016 | Boguraev | G06F 40/169 |
| | | | | 707/731 |
| 2016/0180242 | A1* | 6/2016 | Byron | G06N 20/00 |
| | | | | 706/11 |
| 2016/0266650 | A1* | 9/2016 | Meekhof | G09G 5/18 |
| 2018/0285682 | A1* | 10/2018 | Najibi | G06N 3/0454 |
| 2018/0300576 | A1* | 10/2018 | Dalyac | G06K 9/6263 |
| 2018/0329998 | A1* | 11/2018 | Thomson | H04N 21/41407 |
| 2018/0341632 | A1* | 11/2018 | Akkiraju | G06F 16/35 |
| 2018/0366013 | A1* | 12/2018 | Arvindam | G06F 40/205 |
| 2019/0155382 | A1* | 5/2019 | Ikuta | H04N 5/64 |
| 2019/0205606 | A1* | 7/2019 | Zhou | G06K 9/0014 |
| 2019/0278844 | A1* | 9/2019 | Brixey | G06F 3/04842 |
| 2019/0311202 | A1* | 10/2019 | Lee | G06K 9/627 |
| 2019/0311478 | A1* | 10/2019 | Avendi | G06T 7/75 |
| 2019/0325897 | A1* | 10/2019 | Liu | G10L 25/63 |
| 2019/0347806 | A1* | 11/2019 | Vajapey | G06T 7/20 |
| 2019/0379938 | A1* | 12/2019 | Salo | H04N 21/4666 |
| 2020/0042286 | A1* | 2/2020 | Bui | G06F 9/451 |
| 2020/0175961 | A1* | 6/2020 | Thomson | G10L 15/063 |
| 2020/0211692 | A1* | 7/2020 | Kalafut | G06N 20/00 |

OTHER PUBLICATIONS

Ramesh Manuvirakurike et al. "DialEdit: Annotations for Spoken Conversational Image Editing." Proceedings 14th Joint ACL-ISO Workshop on Interoperable Semantic Annotation, Aug. 25, 2018.

* cited by examiner

Annotation Ontology 302

| Intent (304a) | Object_id (304b) | Location_id (304c) | Attribute (304d) | Inc_dec (304e) | Color (304f) |
|---|---|---|---|---|---|
| "Adjust" | # | # | "Brightness" | "+" | "Red" |
| "Add" | | | "Contrast" | "-" | "White" |
| "Apply" | | | "Highlight" | "n" | "Black" |
| "Crop" | | | "Shadow" | "n+" | "yellow" |
| "Clone" | | | "Saturation" | "n-" | "Purple" |
| "Delete" | | | "Hue" | # | "Orange" |
| "Undo" | | | "Temperature" | | "Blue" |
| "Redo" | | | "Blur" | | "Green" |
| "Move" | | | "Vignette" | | "Grey" |
| "Replace" | | | "Color" | | "Pink" |
| "Rotate" | | | "Black-White" | | # |
| "Scroll" | | | "Feather" | | |
| "Select" | | | "Levels" | | |
| "Zoom" | | | "Curves" | | |
| "Transform" | | | "Vibrance" | | |
| "Swap" | | | "Invert" | | |
| "None" | | | # | | |
| # | | | | | |

*Fig. 3*

Image Editing Action Instructions (Click to Collapse)

| Action | Description |
|---|---|
| Add | Add an object to the image. |
| Apply | Apply an effect to the image. |
| Adjust | Adjust (increase or decrease) an attribute of the image or any object in the image. Attributes include: Blur, Color, Saturation/Hue, Brightness/Contrast, Highlight, Exposure, Other. |
| Clone | Use a cloning tool. |
| Crop | Crop the image. |
| Delete | Remove an object from the image. |
| Move | Move an object in the image. |
| Redo | Redo a change. |
| Replace | Ex: "Please change the pamphlet she is holding into a dictionary." |
| Rotate | Rotate an object in the image. |
| Scroll | Remove an object in the image. |
| Select | Select an object in the image. |
| Swap | Ex: "Please perform a face swap using the man in the yellow shirt and the man in the blue and black polo." |
| Transform | Ex: "flip the photo horizontally." |
| Undo | Undo a previous change. |
| Zoom | Zoom in or out. |
| Other | Any other action which is not included in any of the above catgories. |
| None | The utterance is not about performing an image editing action. |

*Fig. 7B*

GENERATING GROUND TRUTH ANNOTATIONS CORRESPONDING TO DIGITAL IMAGE EDITING DIALOGUES FOR TRAINING STATE TRACKING MODELS

BACKGROUND

Recent years have seen significant improvement in hardware and software platforms for annotating dialogue text in order to train computer models for voice-enabled interactions between humans and computers. Indeed, conventional systems provide mechanisms by which users can annotate dialogue for inclusion in a computer model training data set. For example, conventional systems provide interfaces by which a user may tag portions of a conversation. Conventional system may then generate a training data set based on the user tags.

Although conventional systems can enable annotation of dialogue text, conventional systems are often inaccurate, inefficient, and fail to flexibly accommodate different training regimes. Indeed, as a result of the accuracy, flexibility, and efficiency limitations of conventional systems, no large dataset currently exists for the image editing dialogue domain.

For example, conventional systems cannot generally be applied to image editing applications where dialogue is multi-topic, highly-interactive, and incremental. For instance, image editing dialogue often communicates a single goal over several dialogue turns. To illustrate, an incremental dialogue may include a statement (e.g., "A bit more to the left.") that refers to a first earlier statement (e.g., "Move it to the left.") that refers, in turn to a second even earlier statement (e.g., "Brighten the yellow dog."). In such a scenario, conventional systems fail to capture the state-driven nature of the dialogue.

In addition, digital image editing dialogues often involve open-ended instruction values that cannot be handled using conventional systems. Indeed, the possible combinations of objects, locations, and/or instructions for editing digital images is nearly limitless. Conventional systems that utilize knowledge bases or predefined dictionaries cannot accommodate these unique unseen instruction values that often arise in digital image editing dialogue.

Additionally, conventional systems are inefficient. For example, in an effort to handle high-dimensional annotation applications, some conventional systems utilize a large number of surface-level annotation options. Although this approach can allow systems to handle larger variation in options, they result in inefficiencies with regard to time and user interactions processed by implementing computing devices.

SUMMARY

One or more embodiments provide benefits and/or solve one or more of the foregoing or other problems in the art with systems, methods, and non-transitory computer readable storage media that utilize a unique annotation ontology and user interface to generate training data sets from digital image dialogue for training digital image editing dialogue machine learning models. In particular, the digital image editing dialogue annotation system utilizes a frame-structure annotation ontology that manages both pre-defined and open-ended values during annotation to handle multi-topic image editing dialogues. Moreover, the disclosed systems can define frames (e.g., discrete sections of dialogue corresponding to a particular topic) within the annotation ontology to resolve the problem of co-reference resolution of objects and locations. This approach allows annotations to later be used in training digital image editing dialogue machine learning models to learn co-reference resolution in addition to intent, object, and location interpretation from the annotated data. Furthermore, the disclosed systems can utilize a trained classification algorithm (trained on a one-turn image editing command dataset) to suggest values for populating the annotation ontology, making the annotation pipeline more efficient and accurate.

Additional features and advantages of one or more embodiments of the present disclosure will be set forth in the description that follows, and in part will be obvious from the description, or may be learned by practice of such example embodiments.

BRIEF DESCRIPTION OF THE DRAWINGS

The detailed description is described with reference to the accompanying drawings in which:

FIG. 3 illustrates a diagram of an annotation ontology in accordance with one or more embodiments;

FIGS. 7A-7F illustrate an example interactive image editing dialogue annotation user interface in accordance with one or more embodiments;

DETAILED DESCRIPTION

Figure 1:
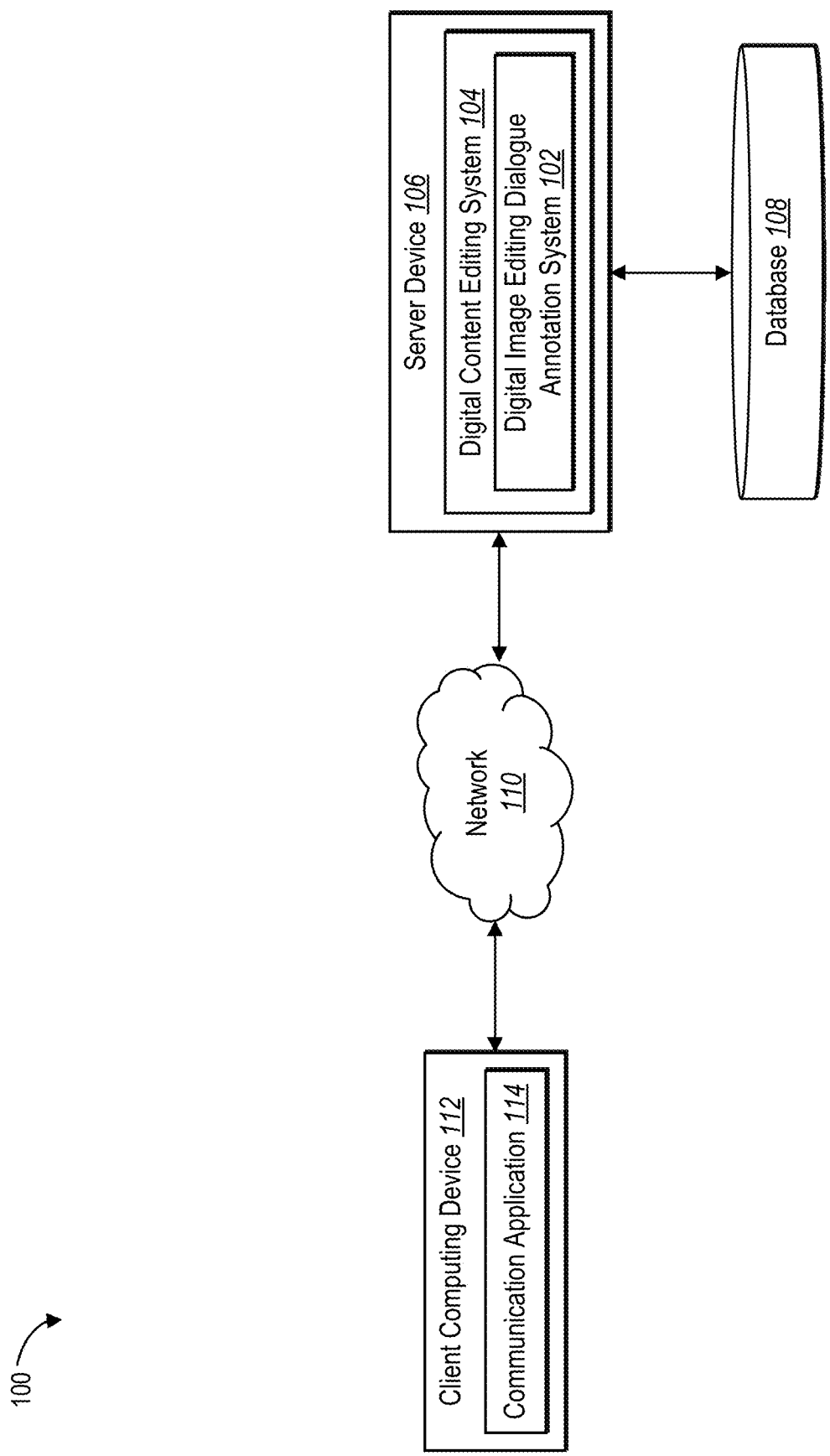
FIG. 1 illustrates an example environment in which a digital image editing dialogue annotation system operates in accordance with one or more embodiments.

One or more embodiments of the present disclosure includes a digital image editing dialogue annotation system that generates annotations of state representations in image editing dialogues for training state-driven image editing dialogue machine learning models. For example, the digital image editing dialogue annotation system tracks user intentions over multiple conversational turns in an image editing dialogue by generating ground truth annotations (e.g., state representation annotations) utilizing an annotation ontology that includes frames corresponding to unique topics. In addition, the digital image editing dialogue annotation system can track challenging open-ended inputs (such as object or location) using an indexing approach. Furthermore, in one or more embodiments the digital image editing dialogue annotation system improves efficiency and accuracy by utilizing a single-turn dataset and classification machine learning model to predict annotation elements to display via an annotation user interface. Utilizing the annotation user interface and ontology, the digital image editing dialogue annotation system generates ground truth annotations within a frame structure that captures the multi-topic and incremental nature of image editing dialogues. Thus, the digital image editing dialogue annotation system accurately and efficiently generates a training data set that include user goals communicated over multiple conversational turns, as well as the annotational history associated with image editing dialogues.

To illustrate, in one or more embodiments, the digital image editing dialogue annotation system identifies a target utterance in a digital image editing dialogue (i.e., a digital image editing dialogue comprising digital communications from a user for editing a digital image). The digital image editing dialogue annotation system can generate a ground truth annotation for the target utterance of the digital image editing dialogue. Specifically, in one or more embodiments, the digital image editing dialogue annotation system provides, for display via an image editing dialogue annotation user interface, a plurality of image editing annotation elements (e.g., intent annotation elements and/or frame annotation elements) together with the target utterance. Based on user interaction with the plurality of image editing annotation elements, the digital image editing dialogue annotation system can determine a frame identifier corresponding to the target utterance and a ground truth image editing intent corresponding to the target utterance. Moreover, in one or more embodiments, the digital image editing dialogue annotation system generates the ground truth annotation for the target utterance based on the frame identifier and the ground truth image editing intent. In addition, the digital image editing dialogue annotation system can add the target utterance and the ground truth annotation to a training data set for training an image editing dialogue machine learning model.

As just mentioned, in one or more embodiments the digital image editing dialogue annotation system utilizes an image editing dialogue annotation user interface that includes a plurality of image editing annotation elements. In particular, the digital image editing dialogue annotation system can generate an image editing dialogue annotation user interface that includes both open-ended annotation elements and pre-defined annotation elements. For example, with regard to pre-defined annotation elements, the digital image editing dialogue annotation system can generate an intent annotation element that corresponds to a set of pre-defined image editing intents (i.e., canonical intent forms). Similarly, with regard to open-ended annotation elements, digital image editing dialogue annotation system can generate an object annotation element or a location annotation element that allows for user input of objects and/or locations.

As mentioned above, the digital image editing dialogue annotation system can utilize an annotation ontology to generate the ground truth (state representation) annotation. Specifically, the digital image editing dialogue annotation system can utilize an annotation ontology that includes ontology slots corresponding to various annotation elements. The digital image editing dialogue annotation system can thus include pre-defined ontology slots (corresponding to user input of canonical forms) and open-ended ontology slots (corresponding to open-ended user input). For example, in one or more embodiments, the digital image editing dialogue annotation system utilizes an annotation ontology that includes ontology slots for an intent, an attribute associated with the intent, a frame, a location relative to a digital image referenced in the digital image editing dialogue, an object relative to the digital image, and a color associated with the object.

The digital image editing dialogue annotation system can generate ground truth annotations (e.g., state representation annotations) by mapping pre-defined or open ended user input identified via the plurality of image editing annotation elements to the annotation ontology. For example, the digital image editing dialogue annotation system can map open-ended user input to indexes corresponding to open-ended ontology slots. To illustrate, the digital image editing dialogue annotation system can identify user selection of an object from a target utterance, convert the selection to an object index (e.g., object identifier), and populate an open-ended ontology slot with the object index. Similarly, the digital image editing dialogue annotation system can identify user input of a location, convert the user input to a location index (e.g., location identifier), and populate an open-ended ontology slot with a location identifier. The digital image editing dialogue annotation system can then generate the ground truth annotation (e.g., state representation annotations) utilizing the object index and the location index. Utilizing this indexing approach, the digital image editing dialogue annotation system can accept open-ended surface forms but generate uniform, indexed annotations that can be utilized in supervised learning.

As mentioned above, the digital image editing dialogue annotation system can also generate and provide suggested annotations via the image editing dialogue annotation user interface. In particular, the digital image editing dialogue annotation system can utilize one or more classification neural networks to generate suggested annotations for target utterances to improve accuracy and reduce time in generating ground truth annotations. For example, the digital image editing dialogue annotation system can apply an image editing classification neural network to a target utterance to identify a set of likely intents corresponding to the target utterance. The digital image editing dialogue annotation system can then provide the set of intents for display (e.g., via an image editing annotation element in the image editing dialogue annotation user interface). By providing a subset of canonical intents, the digital image editing dialogue annotation system increases the accuracy and efficiency of the resulting ground truth annotation.

As mentioned previously, the digital image editing dialogue annotation system can also utilize a frame structure in generating ground truth annotations. For example, the digital image editing dialogue annotation system can generate ground truth annotations specific to particular frames, where each frame tracks a topic. For instance, the digital image editing dialogue annotation system can generate ground truth annotations with frame identifiers that identify common topics (e.g., the same intent, object, and/or location)

across individual target utterances in an image editing dialogue. This frame structure enables the digital image editing dialogue annotation system to maintain a history of the image editing dialogue and train an image editing dialogue machine learning model for co-reference resolution.

The digital image editing dialogue annotation system provides many advantages and benefits over conventional systems and methods. As mentioned above, conventional systems inaccurately annotate each dialogue utterance in a vacuum, leading to co-reference confusion and other inaccuracies. As an initial matter, the digital image editing dialogue annotation system can generate a large dataset for the image editing dialogue domain. Moreover, by generating ground truth annotations within a frame structure, the digital image editing dialogue annotation system can accurately capture the state-driven, multi-topic, and incremental nature of an image editing dialogue. Specifically, the digital image editing dialogue annotation system can generate a training data set including ground truth annotations and corresponding target utterances that accurately track common topics across utterances. This allows for more accurate training and resolution of difficult co-reference problems.

In addition, the digital image editing dialogue annotation system can improve flexibility relative to conventional systems. As discussed, the lack of flexibility corresponding to conventional systems leads to inaccurate annotations and ultimately, to inaccurate supervised machine learning models. The digital image editing dialogue annotation system can generate large training datasets for training digital image editing machine learning models to learn different varieties and combinations of intentions, attributes, objects, or locations in image editing dialogues. Indeed, by utilizing an indexing approach that can handle both open-ended and pre-defined inputs, the digital image editing dialogue annotation system can accommodate the wide variety of intents, objects, and locations portrayed in digital images while generating a robust, uniform framework that machine learning models can use for ground truth annotations.

Moreover, the digital image editing dialogue annotation system improves upon the efficiency of conventional systems. As mentioned above, conventional systems require a large the number of user interactions and user interfaces as the number of surface-level options increases. By utilizing the disclosed image editing dialogue annotation user interface, the digital image editing dialogue annotation system can generate ground truth annotations in very little time and few user interactions. For instance, by utilizing an annotation ontology and image editing annotation elements that can accommodate both open-ended and pre-defined inputs, the digital image editing dialogue annotation system can reduce the user interactions and interfaces needed to generate ground truth annotations. In addition, by utilizing a classification neural network to suggest image editing annotations, the digital image editing dialogue annotation system can reduce the time and user interactions needed to search out and identify appropriate labels for generating ground truth annotations.

As illustrated by the foregoing discussion, the present disclosure utilizes a variety of terms to describe features and advantages of the digital image editing dialogue annotation system. For example, as used herein, the term "digital image editing dialogue" refers to communications regarding editing a digital image. In particular, a digital image editing dialogue includes digital communications (e.g., digital text or digital audio) from one or more speakers corresponding to editing a digital image.

As used herein, the term "target utterance" refers to a phrase (e.g., one or more words conveying a thought or expression) in a digital image editing dialogue. In particular, the term "target utterance" includes a phrase in a digital image editing dialogue that is to be annotated (e.g., that a user or system seeks to annotate). For example, a target utterance would include a statement to "remove the dog" in a digital image editing dialogue, where a user or system seeks to generate an annotation for the statement.

In one or more embodiments, a target utterance can include one or more "surface terms." Surface terms refer to phrases or terms utilized or referenced in image editing dialogue (or utilized by a user to describe an image editing dialogue). For example, a surface term can include an object (e.g., a dog) utilized or implicitly referenced by a target utterance in an image editing dialogue (e.g., "move the dog," "move it" or "move a little more"). A surface term can include a word or phrase (including a variety of different parts of speech) that is not in a form defined by an annotation ontology. Thus, as described below, the digital image editing dialogue annotation system can map a surface term to a canonical form utilized by the annotation ontology.

As used herein, an "annotation ontology" refers to a digital framework for annotating digital image dialogue. In particular, an annotation ontology can include a database, array, table, or digital item identifying a set of slots, concepts, components, or categories for state representation annotations corresponding to digital image dialogue. For example, in one or more embodiments, an annotation ontology includes one or more ontology slots.

As used herein, an "ontology slot" refers to a component, concept, or category within an annotation ontology. In particular, an ontology slot can include a component or category of an annotation ontology that can be populated with a value. Moreover, an ontology slot can include a component of an annotation ontology that corresponds to (e.g., accepts or handles) a pre-defined canonical form.

As used herein, ontology slots may be "open-ended ontology slots" or "pre-defined ontology slots." In particular, an open-ended ontology slot is an ontology slot that accepts, handles, or accommodates open-ended values. As used herein, an "open-ended value" refers to a user-defined term or value (e.g., a term from a target utterance identified by a user). For example, objects and locations discussed in target utterances may be mapped to open-ended ontology slots as user-defined values.

A pre-defined ontology slot is an ontology slot that accepts pre-defined canonical forms. As used herein, a "pre-defined canonical form," "(or "pre-defined form" or "canonical form") refers to a pre-defined form (or set of values) corresponding to an ontology slot. In particular, a canonical form can comprise a set of values that an ontology slot will accept, receive, or utilize. For example, an intent ontology slot can accept canonical forms such as, "adjust," "add," "apply," "crop," and so forth.

As described in greater detail below, in one or more embodiments, the digital image editing dialogue annotation system can map a surface term in a target utterance to a pre-defined canonical form based on user input and can then generate a ground truth annotation that includes the determined canonical form based on the annotation ontology.

As used herein, a "ground truth annotation" refers to a classification of a target utterance. In particular, a ground truth annotation includes a classification label reflecting one or more characteristics of a target utterance. For example, a ground truth annotation can include ground truth labels for a target utterance defining an intent (e.g., an intent to perform an editing operation on a digital image), an object (e.g., an object portrayed in a digital image referenced in the target utterance), a location (e.g., a location of an editing operation within a digital image), a frame (e.g., a topic), an attribute, an editing value (e.g., a magnitude of an edit to a digital image) and/or a color (e.g., a color corresponding to an edit of a digital image). As described below, the digital image editing dialogue annotation system can generate the ground truth annotation by populating annotation slots in an annotation ontology with values (e.g., ground truth labels). For example, ground truth annotations can include a list of tuples where each tuple includes a slot name (e.g., "intent," "attribute," "location identifier," etc. of an ontology slot) and a corresponding value (e.g., in a canonical form).

In addition, as used herein, the term "training data set" refers to a collection of data used to train a machine learning model. In particular, a training data set can include a plurality of target utterances and corresponding ground truth annotations. In one or more embodiments, the digital image editing dialogue annotation system (or a third-party system) utilizes a training data set to train a digital image editing dialogue machine learning model.

As mentioned, the digital image editing dialogue annotation system can train and utilize different machine learning models. For example, as will be discussed in greater detail below, the digital image editing dialogue annotation system can utilize machine learning models to tag portions of a target utterance, to extract intent or other ontology values from a target utterance, and to analyze spoken digital image editing dialogue. As used herein, the term "machine learning model" refers to a computational model that can be tuned (e.g., trained) based on inputs to approximate unknown functions (e.g., a neural network model, reinforcement learning model, regression learning model, or decision tree model). In some embodiments, a machine learning model can employ supervised learning approach utilizing a training data set generated by the digital image editing dialogue annotation system.

As used herein a "neural network model" (or "neural network") refers to a machine learning model that utilizes interconnected artificial neurons (or layers) that communicate and learn to approximate complex functions and generate outputs based on a plurality of inputs provided to the model. In particular, a neural network model includes a computer-implemented algorithm that implements deep learning techniques to analyze inputs (e.g., training input encoded as a machine learning model input vector) to make predictions and that improves in accuracy by comparing generated predictions against ground truth data (e.g., ground truth annotations) and modifying internal parameters for subsequent predictions. Examples of neural network models include convolutional neural networks, deep convolutional neural networks, generative adversarial neural networks, and recurrent neural networks (e.g., an LSTM).

Relatedly, the term "train" refers to utilizing information to tune or teach a machine learning model. The term "training" (used as an adjective or descriptor, such as "training data set") refers to information or data utilized to tune or teach the machine learning model.

As mentioned above, the digital image editing dialogue annotation system can also utilizes a frame structure to track topics across multiple target utterances in order to maintain the history of the digital image editing dialogue, and to generate a state-driven training data set. As used herein, a "frame" refers to an indicator of a topic within a digital image dialogue. In particular, a frame can include an indication of a common topic across multiple utterances in a digital image dialogue. Multiple different frames can thus indicate different topics across utterances in a digital image dialogue. For example, in at least one embodiment, the digital image editing dialogue annotation system defines a new frame when an intent, object, and/or location changes from one utterance to the next in a digital image dialogue.

Additional detail regarding the digital image editing dialogue annotation system will now be provided with reference to the figures. For example, FIG. 1 illustrates a schematic diagram of an example environment 100 for implementing the digital image editing dialogue annotation system 102 in accordance with one or more embodiments. Thereafter, a more detailed description of the components and processes of the digital image editing dialogue annotation system 102 is provided in relation to the subsequent figures.

As shown in FIG. 1, the environment 100 includes a server device 106, a client computing device 112, and a network 110. Each of the components of the environment 100 can communicate via the network 110, and the network 110 may be any suitable network over which computing devices can communicate. Example networks are discussed in more detail below in relation to FIG. 14.

As mentioned, the environment 100 includes the client computing device 112. The client computing device 112 can be one of a variety of computing devices, including a smartphone, tablet, smart television, desktop computer, laptop computer, virtual reality device, augmented reality device, or other computing device as described in relation to FIG. 14. Although FIG. 1 illustrates a single client computing device 112, in some embodiments the environment 100 can include multiple different client computing devices, each associated with a different user. The client computing device 112 can further communicate with the server device 106 via the network 110. For example, the client computing device 112 can receive user input (e.g., a selection of an image editing annotation element) and provide the information pertaining to user input to the server device 106.

In one or more embodiments, the client computing device 112 includes a communication application 114 for providing user input and other information to the digital image editing dialogue annotation system 102. In particular, the communication application 114 may be a web application, a native application installed on the client computing device 112 (e.g., a mobile application, a desktop application, etc.), or a cloud-based application where part of the functionality is performed by the server device 106. The communication application 114 can present or display information to a user, including an image editing dialogue annotation user interface generated by the digital image editing dialogue annotation system 102.

As illustrated in FIG. 1, the environment 100 includes the server device 106. The server device 106 may include one or more individual servers that may generate, store, receive, and transmit electronic data. For example, the server device 106 may receive data from the client computing device 112 in the form of a user input such as a selection of an image editing annotation element. In addition, the server device 106 can transmit data to the client computing device 112 such as dynamic updates to and re-renderings of an image editing dialogue annotation user interface. Furthermore, the server device 106 can include one or more machine learning models (e.g., a classification neural network trained to extract and suggest an intent, attribute, object, or location during the annotation pipeline). In some embodiments, the server device 106 comprises a content server. The server device 106 can also comprise an application server, a communication server, a web-hosting server, a social networking server, or a digital content analytics server.

As shown in FIG. 1, the server device 106 can also include the digital image editing dialogue annotation system 102 as part of a digital content editing system 104. The digital content editing system 104 can communicate with the client computing device 112 to generate, modify, store, and transmit digital content. For example, the digital content editing system 104 can capture, store, manage, and edit digital images (and receive user inputs comprising an intent to modify the digital images). Similarly, the digital content editing system 104 can gather, manage, and analyze digital data collected from a variety of client computing devices. Additionally, in one or more embodiments, the digital image editing dialogue annotation system 102 and/or the digital content editing system 104 can access the database 108. For example, in response to generating and storing a training data set for training an image editing dialogue machine learning model, the digital content editing system 104 can access the training data set from the database 108 in order to train the image editing dialogue machine learning model.

Although FIG. 1 depicts the digital image editing dialogue annotation system 102 located on the server device 106, in some embodiments, the digital image editing dialogue annotation system 102 may be implemented by (e.g., located entirely or in part) on one or more other components of the environment 100. For example, the digital image editing dialogue annotation system 102 may be implemented by the client computing device 112 and/or a third-party device.

In some embodiments, although not illustrated in FIG. 1, the environment 100 may have a different arrangement of components and/or may have a different number or set of components altogether. For example, the client computing device 112 may include one or more machine learning models such as an intent classifier. As another example, the client computing device 112 may communicate directly with the digital image editing dialogue annotation system 102, bypassing the network 110. The digital image editing dialogue annotation system 102 can be implemented in a variety of different ways across the server device 106, the network 110, and the client computing device 112. Additional detail regarding implementing different components of the digital image editing dialogue annotation system 102 across devices is provided below.

As discussed above, the digital image editing dialogue annotation system 102 generates ground truth annotations within a frame-structure in order to provide state-driven training data sets (e.g., for training a digital image editing dialogue machine learning model). For instance, FIG. 2 illustrates an overview of generating ground truth annotations of target utterances in accordance with one or more embodiments.

Figure 2:
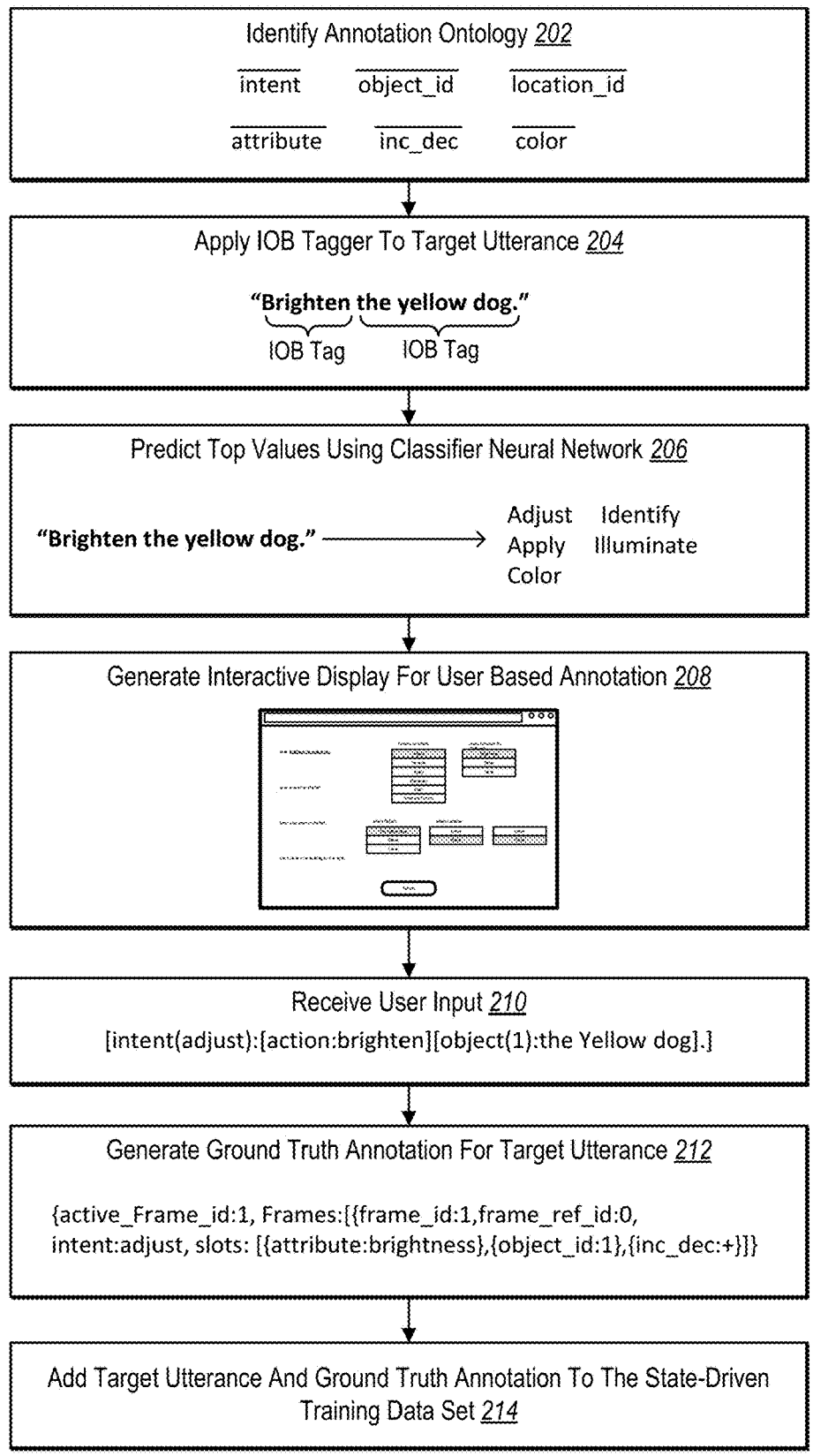
FIG. 2 illustrates a flowchart of generating a ground truth annotation of a target utterance in accordance with one or more embodiments.

Specifically, FIG. 2 illustrates the digital image editing dialogue annotation system 102 performing an act 202 of identifying an annotation ontology. As mentioned above, an annotation ontology can include a plurality of slots (corresponding to concepts or categories) that (when populated with ground truth values) generate consistently structured ground truth annotations. In one or more embodiments, the digital image editing dialogue annotation system 102 identifies an annotation ontology that includes ontology slots that can accept certain types of values. For example, the digital image editing dialogue annotation system 102 can identify an annotation ontology that includes ontology slots that accept values specific to an intent, an object identifier, a location identifier, an attribute, an increment/decrement, and a color. Some ontology slots can accept only pre-defined canonical forms, other ontology slots can accept open-ended values.

As shown in FIG. 2, the digital image editing dialogue annotation system 102 can also perform the act 204 of applying an inside-outside-beginning tagger ("IOB tagger") to one or more target utterances. As will be discussed in greater detail below, in one or more embodiments, the digital image editing dialogue annotation system 102 applies an IOB tagger to an image editing dialogue (e.g., one or more target utterances) to generate one or more IOB tags associated with the target utterance. In at least one embodiment, the IOB tagger parses the image editing dialogue into one or more "chunks" or portions and assigns a tag or label to each chunk. For example, the tags can be associated with parts of speech. In at least one embodiment, the IOB tags serve to break target utterances into one or more surface terms.

As shown in FIG. 2, the digital image editing dialogue annotation system 102 can perform the act 206 of predicting top values using a trained classification neural network. As mentioned above, in order to provide a more efficient and user-friendly annotation interface, the digital image editing dialogue annotation system 102 predicts and provides a subset of values associated with an ontology slot. For example, the classification neural network may predict values that follow a canonical form (e.g., intents from a list of pre-defined intents, attributes from a list of pre-defined attributes). Additionally, the classification neural network may predict other values (e.g., values that are open-ended such as objects or locations). In at least one embodiment, in order to provide this subset of potential values, the digital image editing dialogue annotation system 102 applies a trained image editing classification neural network to a target utterance. To illustrate, the digital image editing dialogue annotation system 102 can apply a trained classification neural network to a target utterance (e.g., "Brighten the yellow dog") to generate a top number of canonical intent values associated with the target utterance (e.g., "adjust," "apply," "color," "identify," "illuminate").

As shown in FIG. 2, the digital image editing dialogue annotation system 102 can also perform the act 208 of generating an interactive display (e.g., an image editing dialogue annotation user interface) for user-based annotation. In one or more embodiments, the digital image editing dialogue annotation system 102 generates the image editing dialogue annotation user interface including the target utterance, additional utterances from the digital image editing dialogue associated with a target utterance (e.g., for context), and one or more image editing annotation elements in connection with the target utterance. In at least one embodiment, each image editing annotation element is associated with an ontology slot from the annotation ontology.

As shown in FIG. 2, the digital image editing dialogue annotation system 102 can also perform the act 210 of receiving user input via the image editing dialogue annotation user interface. For example, in one or more embodiments, the digital image editing dialogue annotation system 102 can combine IOB tags from the IOB tagger (e.g., as in the act 204) with user input received via image editing annotation elements to generate an IOB output specific to an active target utterance. As shown in the act 204, the IOB output for the active target utterance can include a labeled mix of surface terms (e.g., "brighten," "the yellow dog") and pre-defined canonical forms (e.g., "adjust"). Additionally, the IOB output can include an indexing of surface terms (e.g., "object(1): the yellow dog") based on user input.

As shown in FIG. 2, the digital image editing dialogue annotation system 102 can perform the act 212 of generating a ground truth annotation for the active target utterance. For example, the digital image editing dialogue annotation system 102 can generate the ground truth annotation by mapping the information contained with the IOB output for the active target utterance to ontology slots in a ground truth annotation, such that the resulting ground truth annotation is consistently structured and suitable for use in training digital image editing dialogue machine learning models.

In at least one embodiment, the digital image editing dialogue annotation system 102 further generates the ground truth annotation to reflect the frame-structure that informs the state-driven nature of the training data sets used to train a digital image editing dialogue machine learning model. For example, when generating the ground truth annotation of a target utterance, the digital image editing dialogue annotation system 102 can add frame information to the ground truth annotation. As will be discussed further below, the added frame information signals other target utterances in the current digital image editing dialogue that are directed to the same topic as the currently analyzed target utterance. In one or more embodiments, by organizing these target utterances within the same frame, the digital image editing dialogue annotation system 102 captures the multi-topic nature of digital image editing dialogues and provides co-reference resolution of objects and locations with the digital image referenced by all the target utterances in the current digital image editing dialogue.

After generating the ground truth annotation for the target utterance, the digital image editing dialogue annotation system 102 can perform the act 214 of adding the target utterance and the generated ground truth annotation to the state-driven training data set. In one or more embodiments, the digital image editing dialogue annotation system 102 trains a digital image editing dialogue machine learning model by applying the model to training target utterances and then comparing the output of the model to the ground truth annotations associated with the training target utterances. The digital image editing dialogue annotation system 102 can then modify one or more parameters of the digital image editing dialogue machine learning model based on the comparison in order to reduce the measure of loss. Accordingly, the digital image editing dialogue annotation system 102 adds the target utterance and the generated ground truth annotation to the training data set such that the training data set can be used in training a digital image editing dialogue machine learning model.

As mentioned above, the digital image editing dialogue annotation system 102 utilizes an annotation ontology with ontology slots in generating ground truth annotations of target utterances. FIG. 3 illustrates an annotation ontology 302 in accordance with one or more embodiments. As shown in FIG. 3, the digital image editing dialogue annotation system 102 utilizes the annotation ontology 302 to structure ground truth annotations of target utterances. As illustrated, the annotation ontology 302 includes ontology slots 304$a$, 304$b$, 304$c$, 304$d$, 304$e$, 304$f$. Although the annotation ontology 302 is illustrated in FIG. 3 as including the ontology slots 304$a$-304$f$, in additional or alternative embodiments, the annotation ontology 302 can include additional or fewer ontology slots.

In one or more embodiments, each of the ontology slots 304$a$-304$f$ are either pre-defined ontology slots or open-ended ontology slots, and accept pre-defined canonical forms or open-ended values, respectively. For example, as shown in FIG. 3, the ontology slot 304$a$ is a pre-defined ontology slot that can accept any of the pre-defined canonical forms illustrated in the set of pre-defined values 306$a$. Similarly, the ontology slot 304$d$ is a pre-defined ontology slot that can accept any of the pre-defined canonical forms illustrated in the set of pre-defined values 306$d$, the ontology slot 204$e$ is a pre-defined ontology slot that can accept any of the pre-defined canonical forms illustrated in the set of pre-defined values 306$e$, and the ontology slot 304$f$ is a pre-defined ontology slot that can accept any of the pre-defined canonical forms illustrated in the set of pre-defined values 306$f$.

As shown in FIG. 3, the ontology slots 304$b$ and 304$c$ are open-ended ontology slots that can accepts open-ended values. For example, the ontology slot 304$b$ is an open-ended ontology slot that can accept open-ended user input corresponding to one or more objects. Similarly, the ontology slot 304$c$ is an open-ended ontology slot that can accept open-ended user input corresponding to one or more locations. In one or more embodiments, the ontology slots 304$b$ and 304$c$ reference different objects and/or locations as indexed numbers that are mapped to objects from the image editing dialogue (e.g., object "1" corresponds to a "dog" in a target utterance and object 2 corresponds to a "bird" in another target utterance).

In one or more embodiments, each of the ontology slots 304$a$-304$f$ is associated with a type of input. For example, as shown in FIG. 3, the ontology slot 304$a$ is associated with an intent. Accordingly, in one or more embodiments, the pre-defined canonical forms that the ontology slot 304$a$ can accept are associated with different types of intent relative to digital image editing.

Additionally, the ontology slot 304$b$ is associated with an object identifier. As just mentioned, in one or more embodiments the object identifier is open-ended. For example, the digital image editing dialogue annotation system 102 generates an index associated with objects mentioned in a digital image editing dialogue. For instance, the digital image editing dialogue annotation system 102 can receive user input identifying one or more objects (e.g., surface terms in the digital image editing dialogue), and can index the objects and generate the object identifier accepted by the ontology slot 304$b$. In this way, a single object identifier can correspond to a variety of objects, depending on how the objects are referenced (e.g., "the yellow dog" may also be referred to in other utterances as "it," "he," etc.). In one embodiment, the digital image editing dialogue annotation system 102 utilizes the object identifier "0" to refer to the whole digital image as a single object, and any other unique object identifier to refer to objects within the digital image.

Also shown in FIG. 3, the ontology slot 304$c$ is associated with a location identifier. Generally, a location identifier refers to a location (e.g., a grid square, a segment, a portion, a top half, a bottom half, an edge) within the digital image referred to by the digital image annotation dialogue. In one or more embodiments, as mentioned above, the location identifier is an open-ended. For example, as with object identifiers discussed above, the digital image editing dialogue annotation system 102 generates an index associated with locations mentioned in a digital image editing dialogue. For instance, the digital image editing dialogue annotation system 102 can receive user input identifying one or more locations (e.g., surface terms in the digital image editing dialogue), and can index the locations and generate a location identifier accepted by the ontology slot 304$c$ (e.g., map the term "left" from a first target utterance to the location identifier "1" and map the term "bottom" from a second target utterance to the location identifier "2").

Additionally, the ontology slot 304d is associated with an attribute. In one or more embodiments, the ontology slot 304d is a pre-defined ontology slot that can accept a pre-defined canonical form that is an attribute. In at least one embodiment, the values associated with the attribute ontology slot 304d act as modifiers relative to the value associated with the intent ontology slot 304a.

Furthermore, the ontology slot 304e is a pre-defined ontology slot associated with an increase/decrease editing value. In one or more embodiments, the ontology slot 304e can accept a pre-defined canonical form that is a value indicating a direction or magnitude of an edit to a digital image. For example, the canonical form 308e (e.g., "+") is associated with any surface term that increases a value (e.g., such as "more," "up," "increase"). To further illustrate, the canonical form "−" is associated with any surface term that decreases a value (e.g., "a bit less," "decrease"). The canonical form "n" is associated with any absolute surface term value (e.g., "set the value of brightness to 10"), while "n+" is associated with any relative positive surface term number (e.g., "increase hue by 10"), and "n−" is associated with any relative negative surface term number (e.g., "10 less").

Additionally, the ontology slot 304f is a pre-defined ontology slot associated with color. In one or more embodiments, the ontology slot 304f can accept a pre-defined canonical form that is a color.

In order to flexibility handle the complexity of the image editing domain, however, the digital image editing dialogue annotation system 102 also allows users to add additional terms to the canon by providing the user-defined terms (e.g., the user-defined term 310 indicated by the place-holder "#"). For example, in response to user input indicating a user-defined term in association with an ontology slot 304a, the digital image editing dialogue annotation system 102 may add the user-defined term to the set of pre-defined values 306a.

To illustrate, in one or more embodiments, the digital image editing dialogue annotation system 102 may add a user-defined term to the canon associated with the relevant ontology slot after detecting a threshold number of attempts to add the user-defined term. For example, the digital image editing dialogue annotation system 102 may add a user-defined term to the canon associated with the relevant ontology slot after detecting ten previous attempts by one or more users to add the same user-defined term in association with that ontology slot.

Figure 4:
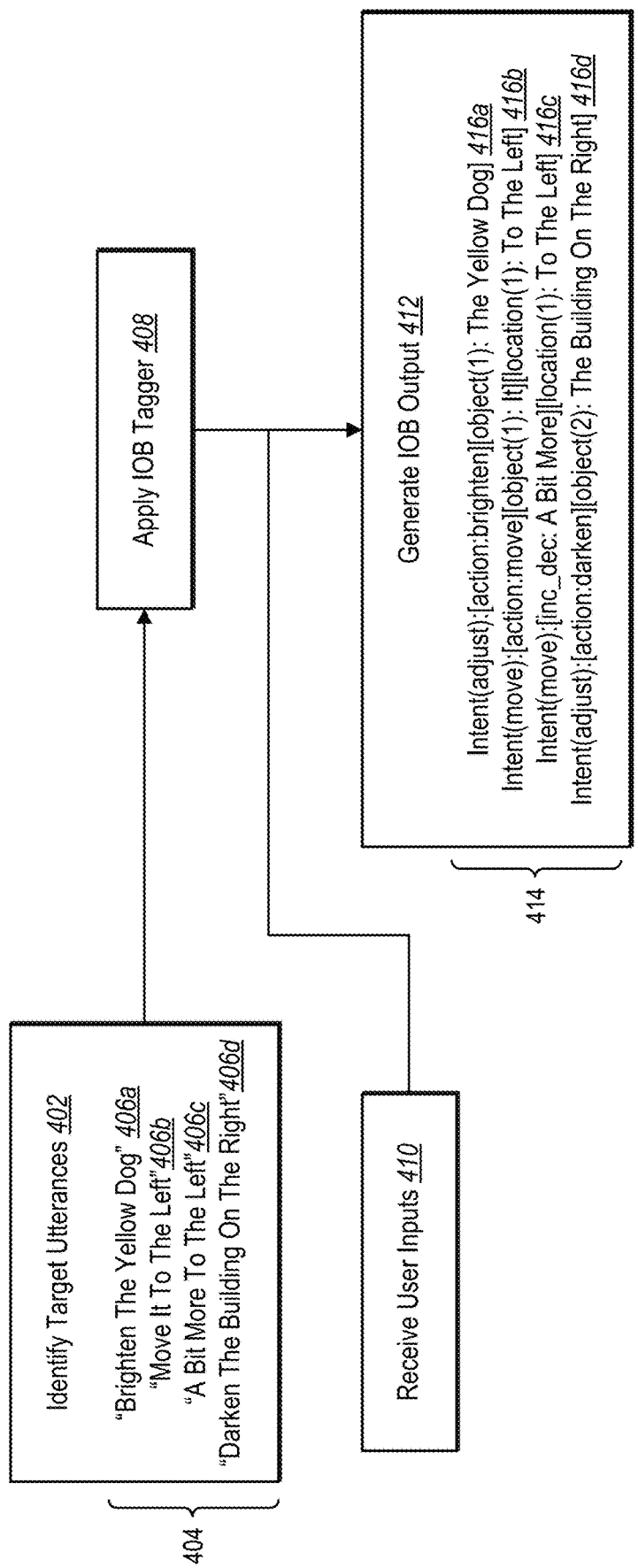
FIG. 4 illustrates a diagram of generating IOB output in accordance with one or more embodiments.

As mentioned above, the digital image editing dialogue annotation system 102 can apply an IOB tagger and utilize user inputs to determine an initial annotation of surface forms (e.g., referred to as IOB output). FIG. 4 provides additional detail with regard to applying an IOB tagger, identifying user input, and generating these initial IOB outputs in relation to surface forms from target utterances. For example, as shown in FIG. 4, the digital image editing dialogue annotation system 102 can perform the initial act 402 of identifying one or more target utterances in an image editing dialogue. As discussed above, an image editing dialogue includes one or more target utterances. As shown in FIG. 4, in response to identifying or accessing the image editing dialogue 404, the digital image editing dialogue annotation system 102 can identify the target utterances 406a, 406b, 406c, and 406d by parsing the image editing dialogue 404, or by performing another similar task in connection with the image editing dialogue 404 in order to break the image editing dialogue 404 into one or more target utterances.

As shown in FIG. 4, the digital image editing dialogue annotation system 102 can perform the act 408 of applying an IOB tagger to the identified target utterances in connection with the received user annotations. As discussed above, in one or more embodiments, an IOB tagger is a machine learning model that generates a language understanding label. For example, the IOB tagger can parse a target utterance (or digital image editing dialogue) into one or more "chunks" or portions and can assign a tag or label (e.g., a part-of-speech label) to each chunk. For example, the IOB tagger can parse a target utterance into one or more surface terms.

As shown in FIG. 4, the digital image editing dialogue annotation system 102 can perform the act 410 of receiving user inputs. For example, in one or more embodiments, the digital image editing dialogue annotation system 102 can receive user inputs associated with one or more of the identified target utterances via an image editing dialogue annotation user interface. In at least one embodiment, the received user inputs can tag or otherwise assign unique identifiers to intents, objects, or locations. For example, the digital image editing dialogue annotation system 102 can receive user inputs that tag or select words or portions within a target utterance or digital image editing dialogue as objects, locations, and/or frames. These tags or selections indicate how the surface terms identified by the IOB tagger will relate to intents, objects, locations, and/or frames in the eventual ground truth annotations. In one or more embodiments, the IOB tagger utilizes the received user inputs to assign unique identifiers (e.g., "object_id," "location_id") to the appropriate surface term within the target utterance.

As shown in FIG. 4, the digital image editing dialogue annotation system 102 performs the act 412 of generating the IOB output. In one or more embodiments, the digital image editing dialogue annotation system 102 generates IOB output by combining user inputs with IOB tagged surface terms to generate an initial annotation of surface terms in a target utterance. For example, as shown in FIG. 4, the IOB output 414 includes IOB output statements 416a, 416b, 416c, 416d, where each IOB output statement 416a-416d corresponds with a target utterance 406a-406d, respectively.

To illustrate, the digital image editing dialogue annotation system 102 can identify the target utterance 406a (e.g., "Brighten the Yellow Dog"). The digital image editing dialogue annotation system 102 also applies the IOB tagger to the target utterance 406a to generate IOB tags associated with portions or chunks of the target utterance 406a. Additionally, the digital image editing dialogue annotation system 102 receives user inputs associating surface terms in one or more of the IOB chunks with intents, objects (e.g., user input tagging "the yellow dog" as an object), locations, or frames in the target utterance 406a. Based on the IOB tags and the user input, the digital image editing dialogue annotation system 102 generates the IOB output statement 416a (e.g., "intent(adjust): [action: brighten] [object(1): The Yellow Dog]"). As shown, the digital image editing dialogue annotation system 102 indexes the identified object to a unique object identifier.

Similarly, the digital image editing dialogue annotation system 102 can identify the target utterance 406b (e.g., "Move it to the left"). The digital image editing dialogue annotation system 102 applies the IOB tagger to the target utterance 406b to generate IOB tags associated with chunks of the target utterance 406b. Additionally, the digital image editing dialogue annotation system 102 can receive user inputs associating surface terms in various IOB chunks with intents, objects, locations, or frames. For example, the digital image editing dialogue annotation system 102 can receive user input associating the target utterance chunk "it" with "the yellow dog," and the target utterance chunk "to the left" with a location. Based on the IOB tags and the user input, the digital image editing dialogue annotation system 102 can generate the IOB output statement 416b (e.g., "intent(move): [action: move] [object(1):it][location(1): to the left]").

Additionally, the digital image editing dialogue annotation system 102 can identify the target utterance 406c (e.g., "A bit more to the left"). The digital image editing dialogue annotation system 102 applies the IOB tagger to the target utterance 406c to generate IOB tags to chunks of the target utterance 406c. The digital image editing dialogue annotation system 102 can receive user inputs associating the target utterance chunk "to the left" with the same location identified in the target utterance 406b. Based on the IOB tags and the user input, the digital image editing dialogue annotation system 102 can generate the IOB output statement 416c (e.g., "intent(move): [value: a bit more] [location(1): to the left]").

Next, the digital image editing dialogue annotation system 102 can identify the target utterance 406d (e.g., "Darken the building on the right"). The digital image editing dialogue annotation system 102 applies the IOB tagger to the target utterance 406d to generate IOB tags associated with chunks of the target utterance 406d. Additionally, the digital image editing dialogue annotation system 102 can receive user inputs identifying intents, objects, locations, or frames in the digital image editing dialogue 404. For example, the digital image editing dialogue annotation system 102 can receive user input associating the surface term "the building on the right" with a new object in the target utterance 406d. Then, based on the IOB tags and the user input, the digital image editing dialogue annotation system 102 can generate the IOB output statement 416d (e.g., "intent(adjust): [action: darken] [object(2): the building on the right]"). As discussed above in FIG. 2, the digital image editing dialogue annotation system 102 can then map the IOB output statements to ground truth annotations.

Figure 5:
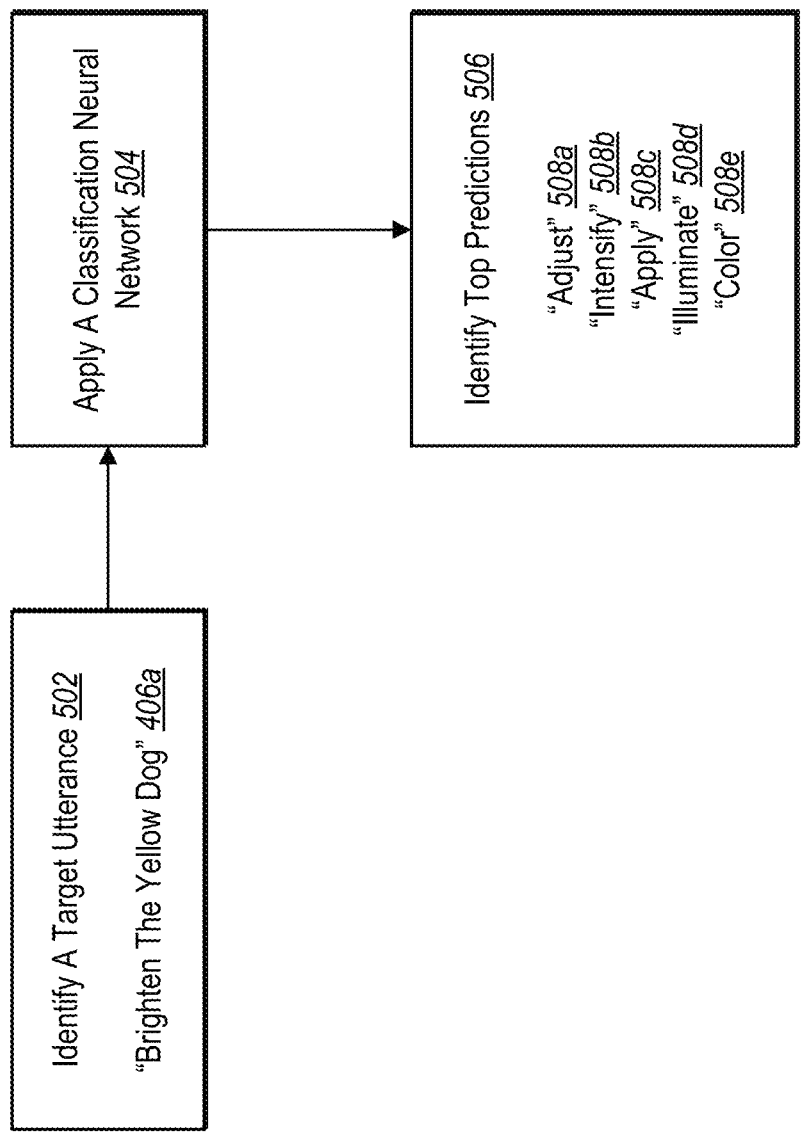
FIG. 5 illustrates a diagram of generating top intent predictions associated with a target utterance in accordance with one or more embodiments.

As mentioned previously, in order to provide a more efficient and user-friendly annotation interface, the digital image editing dialogue annotation system 102 can predict a subset of potential annotations (e.g., intents in canonical form to suggest to a user). FIG. 5 provides additional detail regarding the process by which the digital image editing dialogue annotation system 102 predicts a subset of potential canonical values in accordance with one or more embodiments. For example, as shown in FIG. 5, the digital image editing dialogue annotation system 102 can perform the act 502 of identifying a target utterance. As discussed above, the digital image editing dialogue annotation system 102 can identify a target utterance in response to a user selection or in response to an automatic system selection. As shown in FIG. 5, the digital image editing dialogue annotation system 102 identifies the target utterance 406a (e.g., "Brighten The Yellow Dog").

Next, in order to generate top predictions associated with the identified target utterance, the digital image editing dialogue annotation system 102 performs the act 504 of applying a classification neural network to the target utterance. For example, the digital image editing dialogue annotation system 102 can apply an image editing intent classification neural network to the target utterance 406a to generate a top number of intent predictions. In additional or alternative embodiments, the digital image editing dialogue annotation system 102 can apply different types of classification neural networks (e.g., an attribute classification neural network) or a multi-type classification neural network to a target utterance.

In one or more embodiments, the classification neural network is a machine learning model trained to generate predictions relative to a particular objective. For example, the digital image editing dialogue annotation system 102 can train an image editing intent classification neural network with intent training data including training utterances and ground truth intents, where ground truth intents correspond with intents within the training utterances. In a training cycle, the digital image editing dialogue annotation system 102 applies the image editing intent classification neural network to a training utterance and compares the output of the image editing intent classification neural network to the ground truth intent associated with the training utterance. The digital image editing dialogue annotation system 102 can then modify one or more parameters of the image editing intent classification neural network based on the comparison in order to reduce the measure of loss.

Returning to FIG. 5, the digital image editing dialogue annotation system 102 can perform the act 506 of identifying top predictions utilizing the classification neural network associated with the target utterance 406a. For example, as shown in FIG. 5, the digital image editing dialogue annotation system 102 can determine top predictions 508a (e.g., "Adjust"), 508b (e.g., "Intensify"), 508c (e.g., "Apply"), 508d (e.g., "Illuminate"), and 508e (e.g., "Color") from an image editing intent classification neural network.

In one or more embodiments, the classification neural network outputs a predetermined number (e.g., five) of top predictions. For example, in at least one embodiment, the classification neural network includes a max pooling or other similar layer that calculates a score associated with predictions associated with a target utterance. In that scenario, the classification neural network can output a threshold number (e.g., five) of predictions with the highest scores. In additional or alternative embodiments, the digital image editing dialogue annotation system 102 receives the top predictions 508a-508e after applying the classification neural network to the target utterance 406a a predetermined number of times. In that scenario, the classification neural network may include one or more memory units that track previous predictions to ensure a unique prediction at every application.

Figure 6:
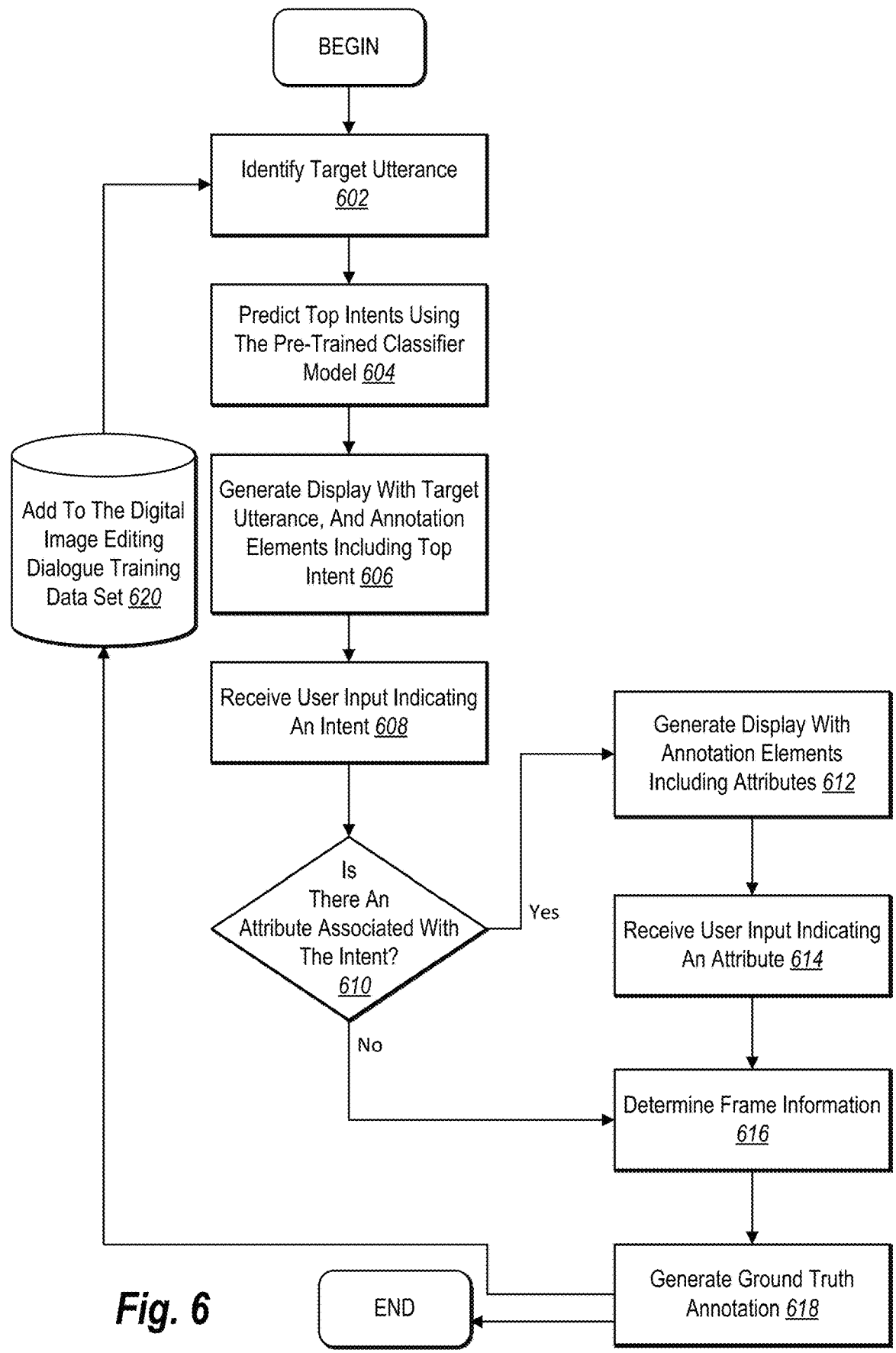
FIG. 6 illustrates a flowchart of a series of acts for generating a ground truth annotation of a target utterance in accordance with one or more embodiments.

FIG. 6 illustrates a process diagram of an example embodiment where the digital image editing dialogue annotation system 102 provides predicted intent canonical forms associated with a target utterance and receives user inputs via an interactive image editing dialogue annotation user interface in order to generate a ground truth annotation. For example, as shown in FIG. 6, the digital image editing dialogue annotation system 102 begins by performing the act 602 of identifying a target utterance. As discussed above, the digital image editing dialogue annotation system 102 can identify a target utterance in response to a user selection of the target utterance via the interactive image editing dialogue. Additionally or alternatively, the digital image editing dialogue annotation system 102 can identify a target utterance in response to an automatic system selection of the target utterance (e.g., as part of an automated processing cycle associated with an image editing dialogue).

Next, the digital image editing dialogue annotation system 102 performs the act 604 of predicting top intents associated with the target utterance using a pre-trained classifier model (e.g., a classification neural network as discussed with reference to FIG. 5). For example, as discussed above, the digital image editing dialogue annotation system 102 can train and utilize an image editing intent classification neural network to extract a number of top possible intents (or objects, locations, attributes, frames, and/or colors) from a target utterance.

In response to receiving the top intent predictions from the intent classifier (e.g., the image editing intent classification neural network), the digital image editing dialogue annotation system 102 performs the act 606 of generating a display (e.g., an interactive image editing dialogue annotation user interface). For example, as will be described in greater detail below, the digital image editing dialogue annotation system 102 can generate an interactive image editing dialogue annotation user interface including the target utterance and image editing annotation elements including the top intents. In additional or alternative embodiments, the digital image editing dialogue annotation system 102 can generate the interactive image editing dialogue annotation user interface to include additional display elements including instructions, other target utterances to give context to the currently active target utterance, and annotation elements for objects, locations, attributes, frames and/or colors (e.g., annotation elements that display other top values determined at the act 604).

In at least one embodiment, the digital image editing dialogue annotation system 102 generates the interactive image editing dialogue annotation user interface with an image editing annotation element associated with intent relative to the target utterance. Then in response to user input associated with the intent image editing annotation element, the digital image editing dialogue annotation system 102 can incrementally re-render and update the image editing dialogue annotation user interface to include additional image editing annotation elements associated with other ontology slots (e.g., attribute, object identifier, location identifier).

After generating the image editing dialogue annotation user interface, the digital image editing dialogue annotation system 102 performs the act 608 of receiving user input indicating an intent via the image editing dialogue annotation user interface. For example, the digital image editing dialogue annotation system 102 can receive a user selection associated with one of the top predicted intents via the intent image editing annotation element in the image editing dialogue annotation user interface. Alternatively, the digital image editing dialogue annotation system 102 can receive user input via the intent image editing annotation element that include a user-defined intent (e.g., a user-entered text input).

Next, as shown in FIG. 6, the digital image editing dialogue annotation system 102 can perform the act 610 of determining whether there is an attribute associated with the selected intent (e.g., whether the canonical form for the intent includes associated attributes). In response to determining there is an associated attribute (e.g., yes), the digital image editing dialogue annotation system 102 can perform the act 612 of generating or re-rendering the display with annotation elements including attributes. For example, the digital image editing dialogue annotation system 102 can apply a classification neural network trained to extract canonical attribute forms to the target utterance and provide a top number of extracted attributes in the display. The digital image editing dialogue annotation system 102 can then perform the act 614 of receiving user input indicating an attribute.

As shown in FIG. 6, the digital image editing dialogue annotation system 102 can also perform the act 616 of determining frame information associated with the target utterance. As discussed above, the digital image editing dialogue annotation system 102 utilizes a frame structure to track topics and maintain a dialogue history within a training data set. Accordingly, at act 616, the digital image editing dialogue annotation system 102 can determine frame information (e.g., a frame identifier) associated with the current target utterance in response to receiving user input indicating whether the topic of the current target utterance is the same as the topic of a previous target utterance. Alternatively, the digital image editing dialogue annotation system 102 can automatically determine whether a topic change has occurred (e.g., determine a new intent, object, and/or location and thus determine a new topic). In one or more embodiments, the topic of the current target utterance is the same as the topic of a previous target utterance when there is no change to an intent, an object, or a location mentioned in both the current target utterance and the previous target utterance. If there has been a change, then the digital image editing dialogue annotation system 102 can determine that the current target utterance is associated with a new frame.

With the determined intent and the frame information, the digital image editing dialogue annotation system 102 can perform the act 618 of generating a ground truth annotation. As discussed above, the digital image editing dialogue annotation system 102 can generate a ground truth annotation based on the detected user input via the image editing annotation elements within the image editing dialogue annotation user interface. For example, in response to user input (and applying an IOB tagger), the digital image editing dialogue annotation system 102 can generate a ground truth annotation that maps a surface term to a selected canonical intent. Based user input, the digital image editing dialogue annotation system 102 can further generate the ground truth annotation to include an attribute associated with the canonical intent.

As mentioned above, the digital image editing dialogue annotation system 102 also generates ground truth annotations within a frame structure in order to track the incremental nature of digital image editing dialogues. Accordingly, the digital image editing dialogue annotation system 102 further performs the act 618 of generating the ground truth annotation by adding frame information to the ground truth annotation. For example, as discussed above, the digital image editing dialogue annotation system 102 determines a frame identifier (e.g., an indexed number for the number of distinct topics in a digital image editing dialogue) for the ground truth annotation based whether a topic of the current target utterance is the same as or different from a topic associated with a previous target utterance. Based on this determination, the digital image editing dialogue annotation system 102 can determine an appropriate frame identifier to include in the ground truth annotation for the current target utterance.

After generating the ground truth annotation, the digital image editing dialogue annotation system 102 can perform the act 620 of adding the ground truth annotation to the digital image editing dialogue training data set. For example, as mentioned above, the digital image editing dialogue annotation system 102 generates ground truth annotations in order to create training data sets for training an image editing dialogue machine learning model. As such, the digital image editing dialogue annotation system 102 can add to or start a training data set by adding the ground truth annotation and its associated target utterance to the training data set within a data repository (e.g., the database 108 as shown in FIG. 1).

The example embodiment illustrated in FIG. 6 shows the digital image editing dialogue annotation system 102 generating a ground truth annotation including an intent, frame information, and possibly an attribute associated with the intent. In additional embodiments, the digital image editing dialogue annotation system 102 can generate ground truth annotations with additional annotation information. For example, in response to receiving user input relative to additional ontology slots in the annotation ontology, the digital image editing dialogue annotation system 102 can generate ground truth annotations that include an intent, frame identifier, one or more attributes, an object identifier, a location identifier, an increase/decrease value, and a color. Additionally, the digital image editing dialogue annotation system 102 can generate ground truth annotations that include any combination or subset of values associated with the ontology slots (e.g., the ontology slots 304a-304f illustrated in FIG. 3) of the annotation ontology 302. Moreover, in alternative embodiments, the digital image editing dialogue annotation system 102 can generate ground truth annotations that include any combination or subset of values associated with ontology slots in any other digital image editing dialogue annotation ontology.

Figure 7A:
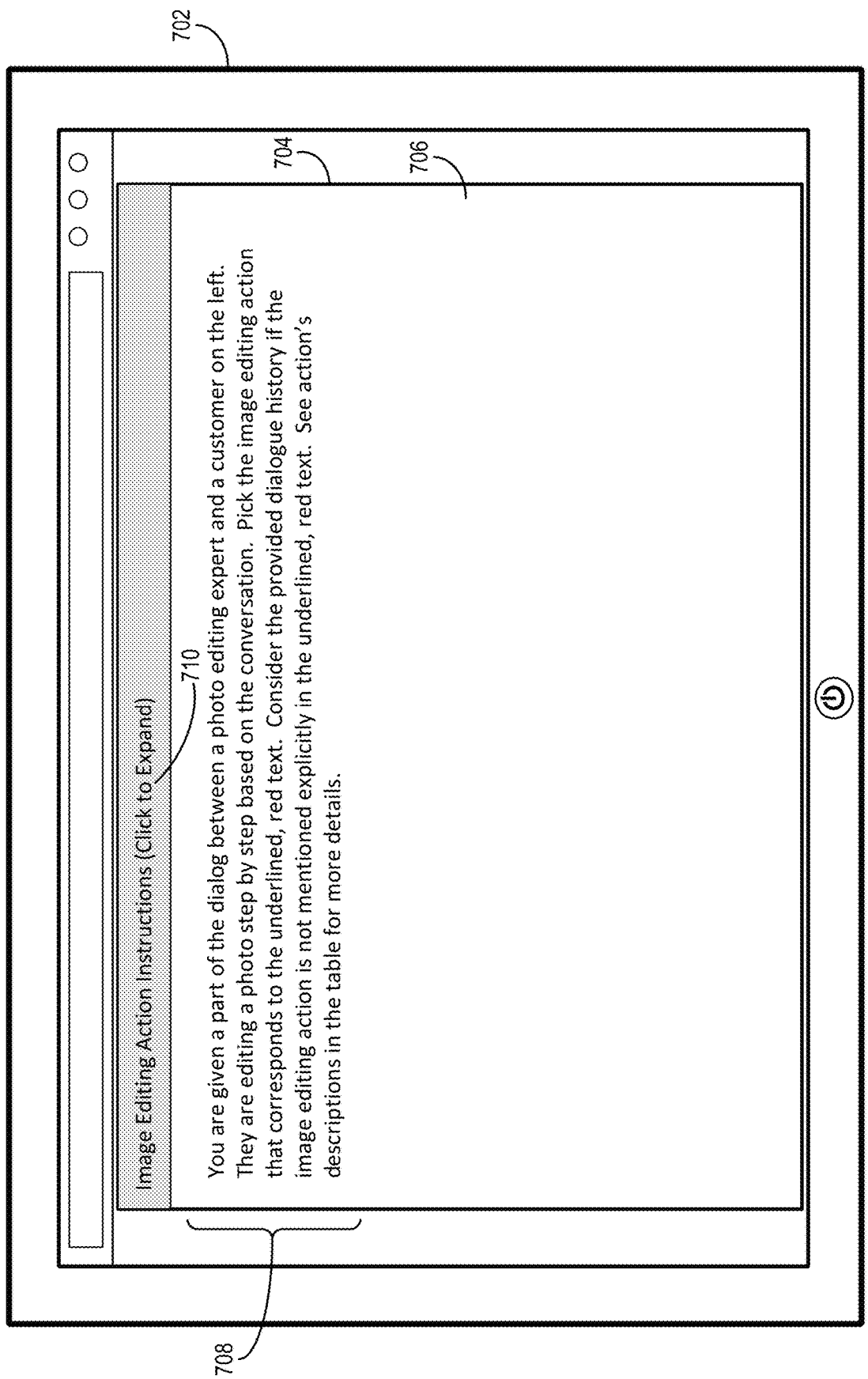

As discussed above, the digital image editing dialogue annotation system 102 generates ground truth annotations in response to receiving user input via image editing annotations elements within an interactive image editing dialogue annotation user interface. FIGS. 7A-10 illustrate further embodiments of the digital image editing dialogue annotation system 102 in connection with an interactive image editing dialogue annotation user interface in accordance with one or more embodiments. For example, FIG. 7A illustrates the digital image editing dialogue annotation system 102 providing the image editing dialogue annotation user interface 706 on a display 704 of a client computing device 702 (e.g., such as the client computing device 112 shown in FIG. 1). As shown in the embodiment illustrated in FIG. 7A, the digital image editing dialogue annotation system 102 can provide the image editing dialogue annotation user interface 706 as part of a web page.

As illustrated, the image editing dialogue annotation user interface 706 can include instructions 708 and a selectable option 710 to view additional instructions. In one or more embodiments, the digital image editing dialogue annotation system 102 generates ground truth annotations of target utterances in response to receiving user input from a user who may be unsophisticated with regard to state-driven dialogue annotation. As such, in at least one embodiment, as shown in FIG. 7A, the digital image editing dialogue annotation system 102 generates the image editing dialogue annotation user interface 706 with the instructions 708 to provide further guidance to a user.

Additionally, as shown in FIG. 7A, the image editing dialogue annotation user interface 706 includes a selectable option 710 to view additional instructions. In response to a user selection of the option 710, the digital image editing dialogue annotation system 102 can re-render the image editing dialogue annotation user interface 706 to include an expanded list 712 of instructions as shown in FIG. 7B. In the embodiment illustrated in FIG. 7B, the expanded list 712 includes additional information about canonical forms of intent.

In additional or alternative embodiments, the expanded list 712 can include further information about other canonical forms, user-defined terms, annotations, and/or frames. For example, in one alternative embodiment, the expanded list 712 can include annotator rules including the following:

"Each object and location must have a unique identifier. Object and location identifiers start at 1 at the beginning of an image editing dialogue and reset for each new image editing dialogue."

"If two different target utterances refer to the same object or location, the shared object or location must have the same object or location identifier."

"A location refers to a location or region within the digital image on which an action is being performed, such as a location of a move or a region to be deleted."

"Descriptions of an object are part of the object. For example, in the target utterance, 'the apple on the table,' 'the apple on the table' is the object and there is no location. In the target utterance, 'put the apple on the table,' 'the apple' is the object and 'on the table' is the location."

"'Background' and 'foreground' are objects but 'in the background' is a location."

"There may be cases where an object or location identifier needs to be a list."

Figure 7C:
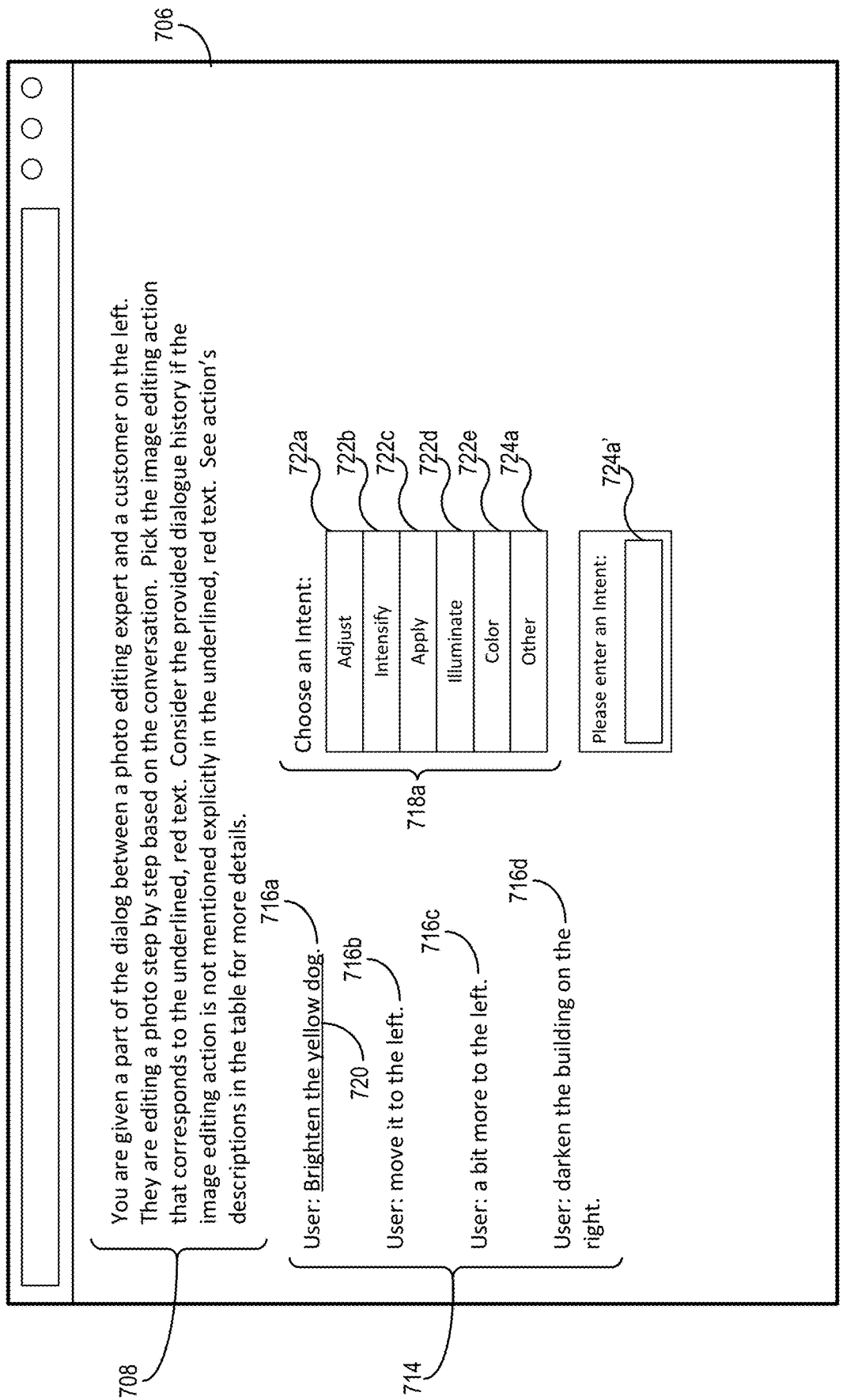

In one or more embodiments, the digital image editing dialogue annotation system 102 can update or re-render the image editing dialogue annotation user interface 706 to include a digital image editing dialogue. For example, as shown in FIG. 7C, the digital image editing dialogue annotation system 102 can update the image editing dialogue annotation user interface 706 to include the digital image editing dialogue 714. As further shown in FIG. 7C, the digital image editing dialogue 714 can include the target utterances 716a, 716b, 716c, and 716d.

The digital image editing dialogue annotation system 102 can update the image editing dialogue annotation user interface 706 to include the digital image editing dialogue 714 in response to various input. For example, in one embodiment, the digital image editing dialogue annotation system 102 includes the digital image editing dialogue 714 in response to a user selection associated with the digital image editing dialogue 714 in a different interface. In another embodiment, the digital image editing dialogue annotation system 102 includes the digital image editing dialogue 714 in response to an automatic system selection associated with the digital image editing dialogue 714 (e.g., as part of the digital image editing dialogue annotation system 102 automatically cycling through digital image editing dialogues needing annotation).

As shown in FIG. 7C, the digital image editing dialogue annotation system 102 can further provide an active target utterance indicator 720 as part of the image editing dialogue annotation user interface 706. In one or more embodiments, the active target utterance indicator 720 serves to indicate to the user the target utterance currently under annotation (e.g., the target utterance 716a) or "active" target utterance. As shown, the active target utterance indicator 720 can be an underline. In other embodiments, the active target utterance indicator 720 can bold the active target utterance, can highlight or change the color of the active target utterance, can provide an asterisk or other icon adjacent to the active target utterance, or can similarly indicate the active target utterance in any suitable way.

The digital image editing dialogue annotation system 102 can identify the active target utterance in various ways. For example, in one embodiment, the digital image editing dialogue annotation system 102 identifies the active target utterance in response to a user selection of a displayed target utterance (e.g., by clicking on the displayed target utterance or otherwise selecting the displayed target utterance). In another embodiment, the digital image editing dialogue annotation system 102 identifies the active target utterance in response to an automatic system selection of the displayed target utterance (e.g., in response to automatically cycling through all displayed target utterances in displayed order).

As further shown in FIG. 7C, in response to the digital image editing dialogue annotation system 102 identifying the target utterance 716a, the digital image editing dialogue annotation system 102 can further update the image editing dialogue annotation user interface 706 to include the image editing annotation element 718a. As shown, the image editing annotation element 718a is associated with intent (e.g., the image editing annotation element 718a can also be referred to as the intent image editing annotation element 718a), and includes the selectable canonical intents 722a, 722b, 722c, 722d, and 722e. As discussed above, the digital image editing dialogue annotation system 102 provides the selectable canonical intents 722a-722e in response to determining the top five canonical intents associated with the target utterance 716a by applying an image editing intent classification neural network.

As shown in FIG. 7C, the image editing annotation element 718a also includes an other option 724a. In one or more embodiments, the image editing intent classification neural network may not predict an intent that aligns with a user's reading of the target utterance 716a. In that scenario, in response to a user selection of the other option 724a, the digital image editing dialogue annotation system 102 can update the image editing dialogue annotation user interface 706 to include a control 724a' (e.g., a text input box) where the user may input an intent term. In some embodiments, the digital image editing dialogue annotation system 102 requires the intent term to match a canonical form (e.g., one of the intents shown in FIG. 7B).

As discussed above, in one or more embodiments, the digital image editing dialogue annotation system 102 can identify a different term provided by a user (e.g., a term that is not in canonical form). In some embodiments, the digital image editing dialogue annotation system can modify the canon based on (repeated) user intents of an alternative term.

Figure 7D:
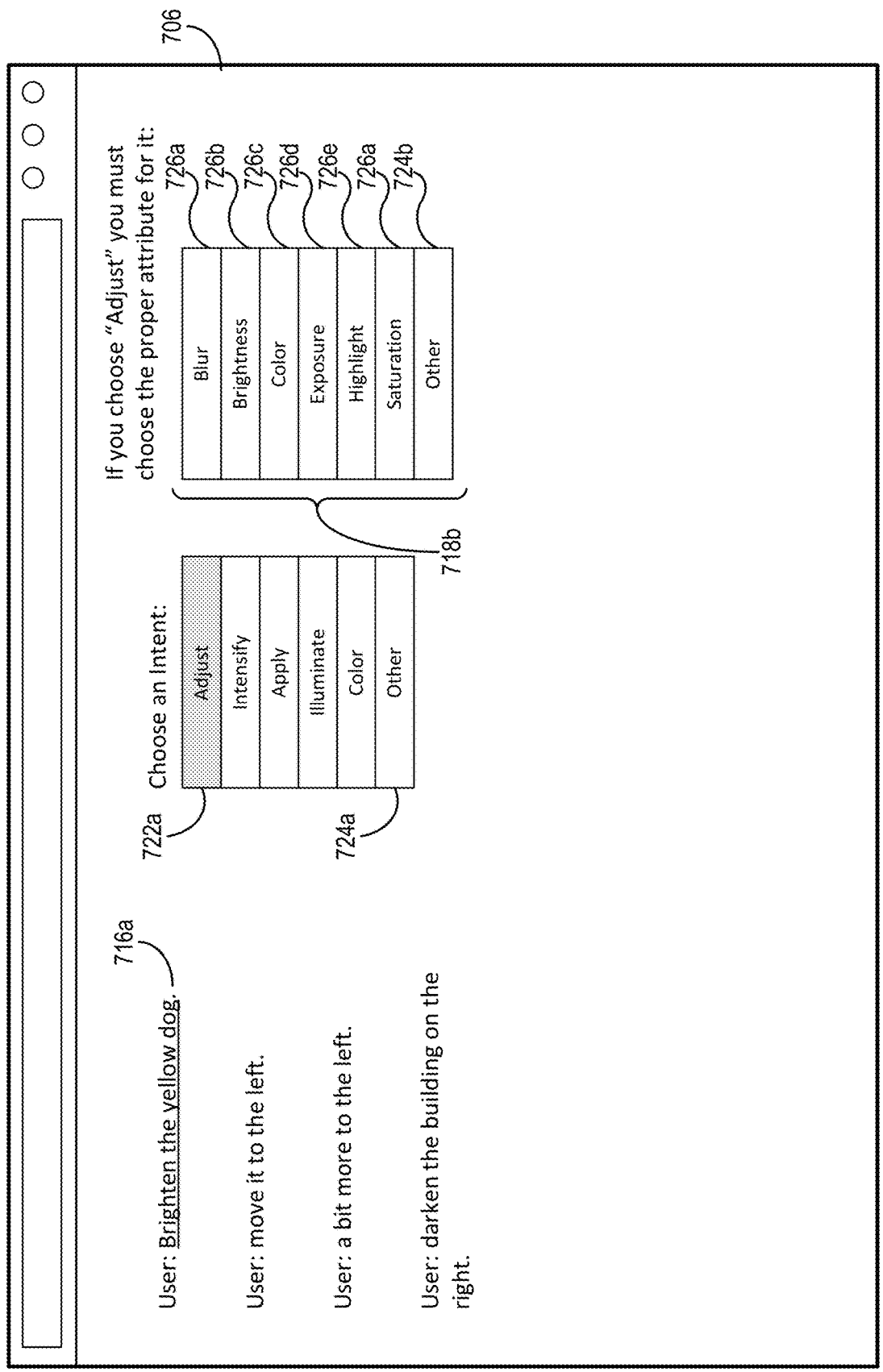

As mentioned previously, the digital image editing dialogue annotation system 102 can provide one or more additional image editing annotation elements. For example, as shown in FIG. 7D, in response to detecting a user selection of the canonical intent 722a (e.g., "Adjust"), the digital image editing dialogue annotation system 102 provides the image editing annotation element 718b (e.g., the attribute image editing annotation element 718b) including the canonical attributes 726a, 726b, 726c, 726d, 726e, and 726f (i.e., attributes corresponding to the "adjust" intent), as well as the other option 724b. As with the other option 724a discussed above, the digital image editing dialogue annotation system 102 can provide the other option 724b in order to receive a different attribute term.

Figure 7E:
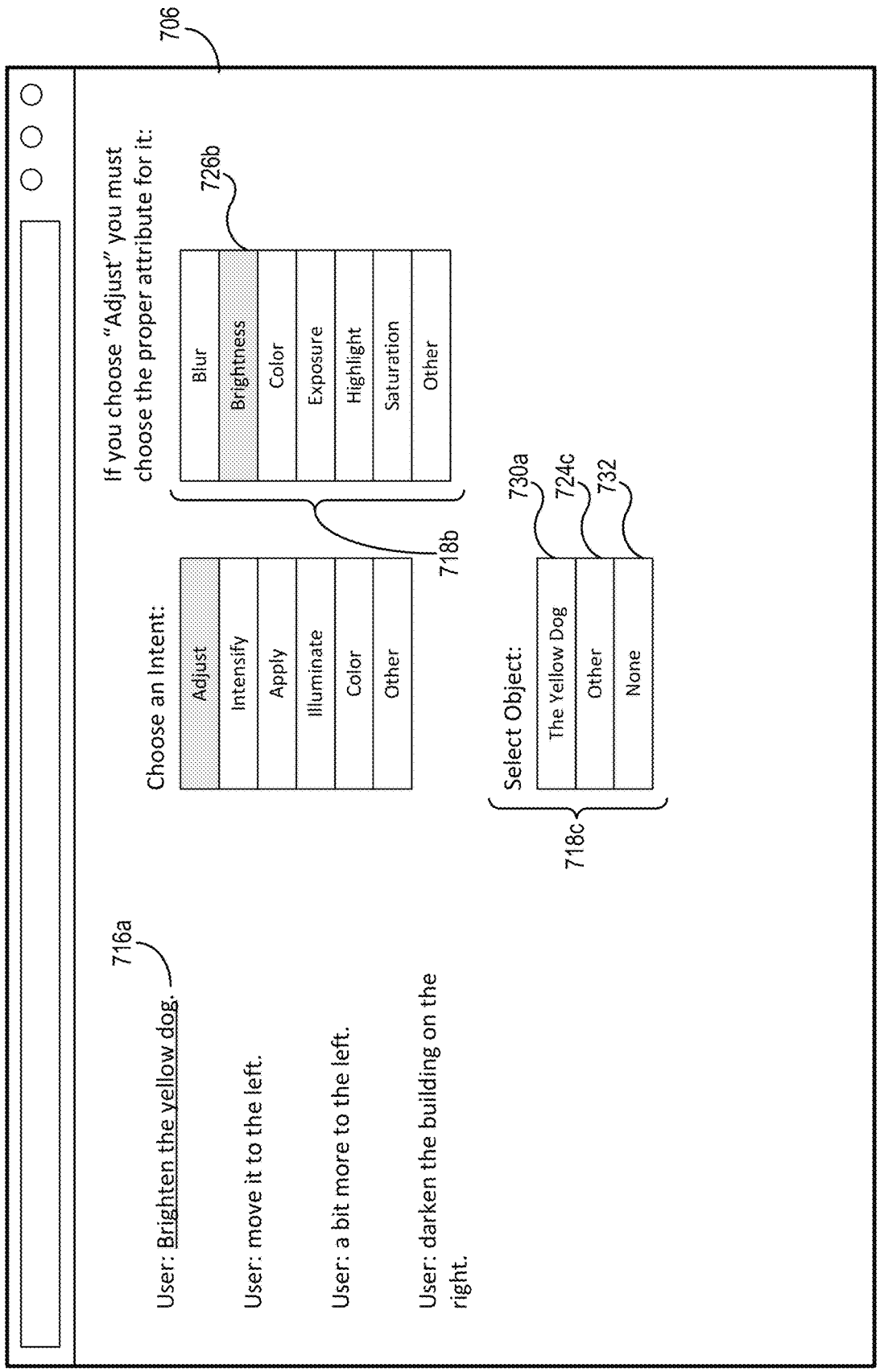

In addition to the image editing annotation element 718b, the digital image editing dialogue annotation system 102 can also provide additional image editing annotation elements. For example, as shown in FIG. 7E, in response to detecting a user selection of the canonical attribute 726b (e.g., "Brightness"), the digital image editing dialogue annotation system 102 can provide the image editing annotation element 718c (e.g., the object image editing annotation element 718c) including the object 730a as well as the other option 724c and the none option 732. As discussed above, the object identifier ontology slot can be an open-ended ontology slot (i.e., that accepts open-ended values). In one or more embodiments, the digital image editing dialogue annotation system 102 provides the object 730a based on the target utterance 716a (e.g., IOB tags associated with the target utterance and/or a machine learning model that predicts one or more objects from the target utterance). The digital image editing dialogue annotation system 102 provides the other option 724c in order to identify a different user-defined term. Furthermore, the digital image editing dialogue annotation system 102 can determine that there is no object within the target utterance 716a in response to detecting a user selection of the none option 732.

In response to detecting a user selection of one of the options within the image editing annotation element 718c, the digital image editing dialogue annotation system 102 can determine, based on IOB tags associated with the target utterance 716a, that no additional portions or chunks of the target utterance 716a need annotation. For example, in response to detecting a user selection of the object 730a (e.g., "The Yellow Dog"), the digital image editing dialogue annotation system 102 can update the image editing dialogue annotation user interface 706 to include the submit button 734.

Figure 7F:
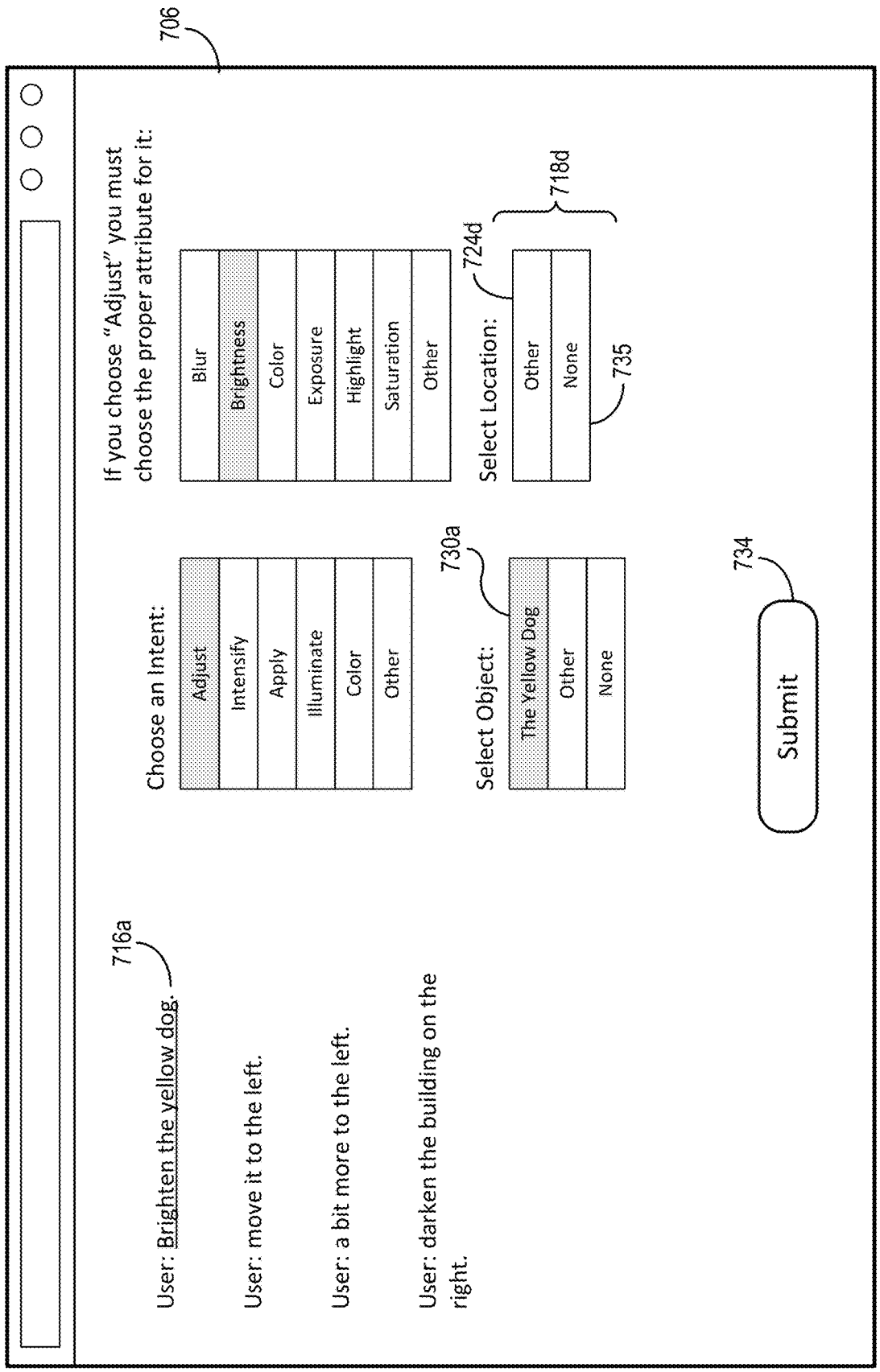

Additionally (or alternatively), as shown in FIG. 7F, in response to detecting a user selection of the object 730a, the digital image editing dialogue annotation system 102 can update the image editing dialogue annotation user interface 706 to include the image editing annotation element 718d (e.g., the location image editing annotation element 718d) including options corresponding with a location associated with the target utterance 716. As discussed above, the location identifier ontology slot is an open-ended ontology slot, meaning it accepts open-ended values. However, as with the target utterance 716a, the digital image editing dialogue annotation system 102 may determine that there is no location within the target utterance (e.g., based on applying an IOB tagger and/or other machine learning model). Accordingly, as discussed above, the digital image editing dialogue annotation system 102 can receive a user-defined term in response to a detected selection of the other option 724d. Alternatively, the digital image editing dialogue annotation system 102 can determine that there is not value associated with that ontology slot (e.g., "Location") in response to a detected selection of the none option 735 and forego providing a location image editing annotation element.

As discussed above, each of the image editing annotation elements 718a-718d are associated with an ontology slot in the annotation ontology utilized by the digital image editing dialogue annotation system 102 (e.g., the annotation ontology 302 shown in FIG. 3). Accordingly, in response to receiving a selection associated with each of the image editing annotation elements 718a-718d, or in response to detecting a selection of the submit button 734, the digital image editing dialogue annotation system 102 can generate ground truth annotation associated with the target utterance 716a.

In at least one embodiment, the digital image editing dialogue annotation system 102 generates the ground truth annotation associated with the target utterance 716a by first generating an IOB output (e.g., an initial annotation of surface terms) associated with the target utterance 716a, and then mapping the IOB output to one or more slots in the annotation ontology. For example, based on the user input received via the image editing dialogue annotation user interface 706 in combination with IOB tags from the IOB tagger, the digital image editing dialogue annotation system 102 can generate the following initial annotation associated with the target utterance 716a:

"intent(adjust): [action: brighten] [object(1): The Yellow Dog]"

The digital image editing dialogue annotation system 102 can then map this initial annotation to one or more slots in the annotation ontology to generate the following ground truth annotation associated with the target utterance 716a (e.g., "Brighten the yellow dog."):

{active_frame_id: 1, Frames:[{frame_id:1, Frame_ref_id: 0, intent:adjust, slots: [{attribute:brightness}, {object_id:1}]}]}

In at least one embodiment, the digital image editing dialogue annotation system 102 determine the frame information associated with the target utterance 716a based on the target utterance 716a being the first target utterance in the digital image editing dialogue 714. For example, as discussed above, the frame information in a ground truth annotation tracks topics and dialogue history from one target utterance to the next. If a target utterance is the first in a digital image editing dialogue (e.g., as with the target utterance 716a), there are no topics or dialogue history to track. Accordingly, for the first target utterance in a digital image editing dialogue, the digital image editing dialogue annotation system 102 includes initial frame information (e.g., "active_frame_id: 1," "frame_id:1," and "Frame_ref_id: 0").

Figure 9:
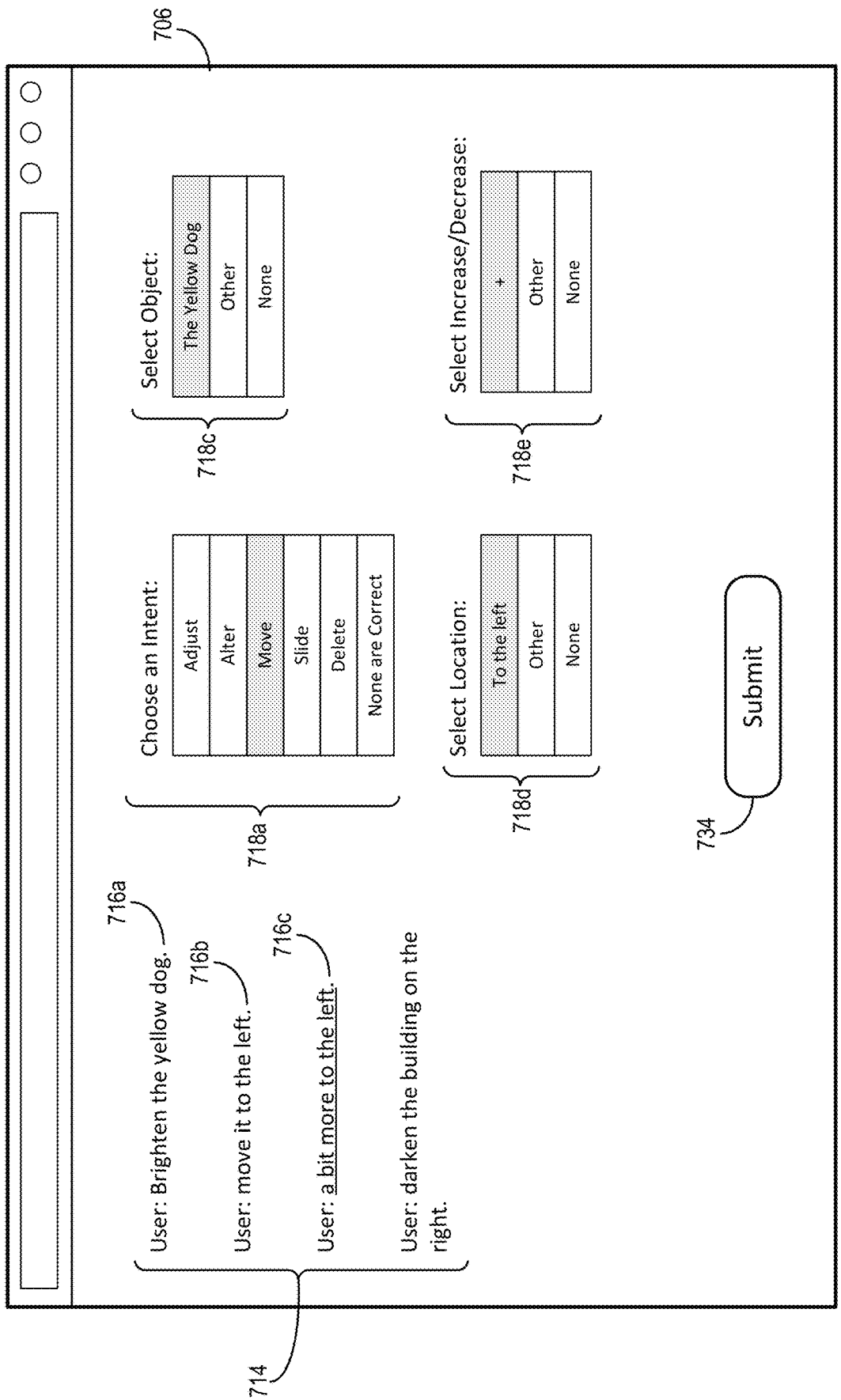
FIG. 9 illustrates an example interactive image editing dialogue annotation user interface in accordance with one or more embodiments.
Figure 10:
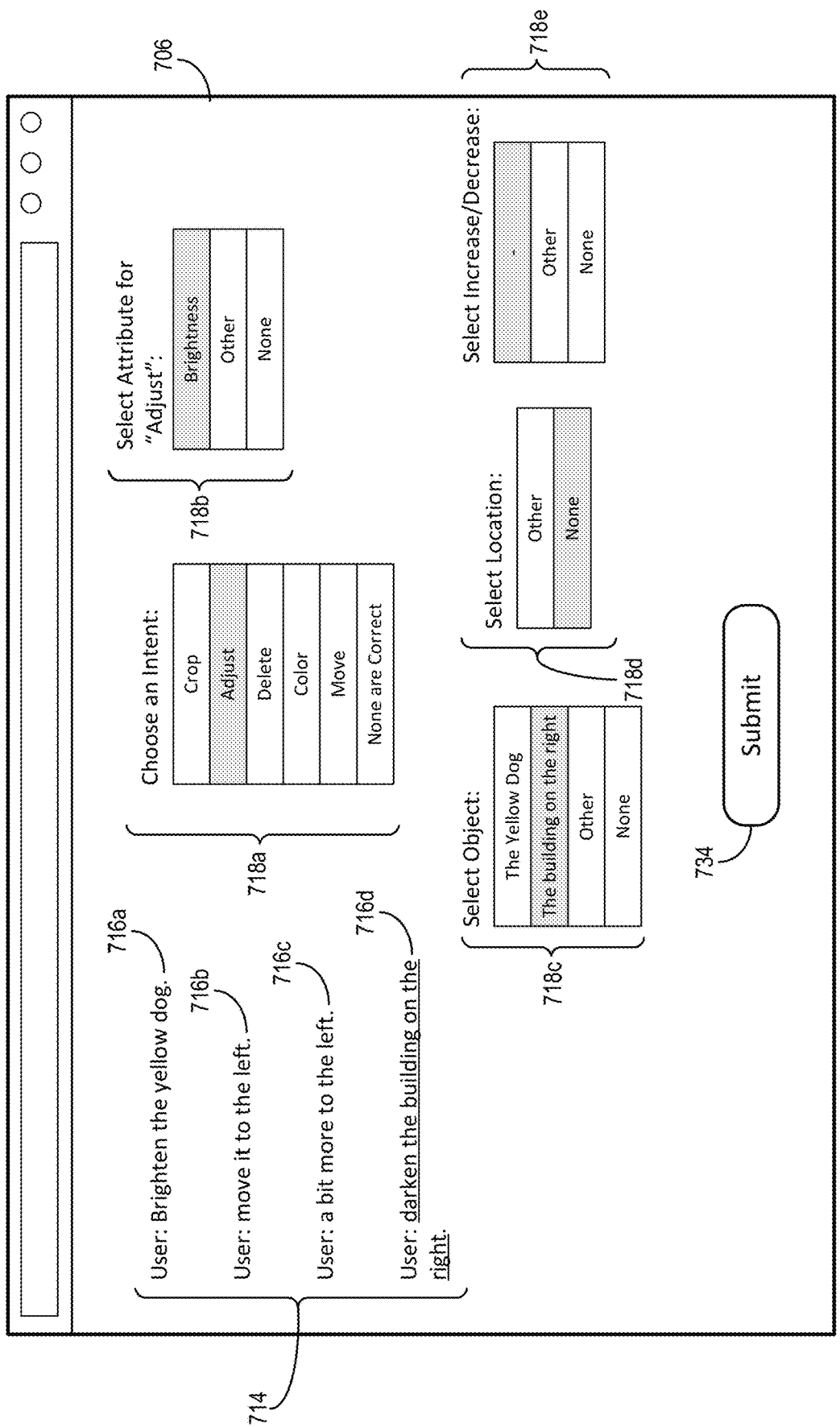
FIG. 10 illustrates an example interactive image editing dialogue annotation user interface in accordance with one or more embodiments.

FIGS. 7A-7F illustrate the digital image editing dialogue annotation system 102 incrementally updating and re-rendering the image editing dialogue annotation user interface 706 to provide each of the image editing annotation elements 718a-718d associated with the target utterance 716a, in turn. For the sake of brevity, FIGS. 8-10 illustrate the final iteration of the incremental updating and re-rendering of the image editing dialogue annotation user interface 706 relative to the target utterances 716b, 716c, and 716d, respectively.

Figure 8:
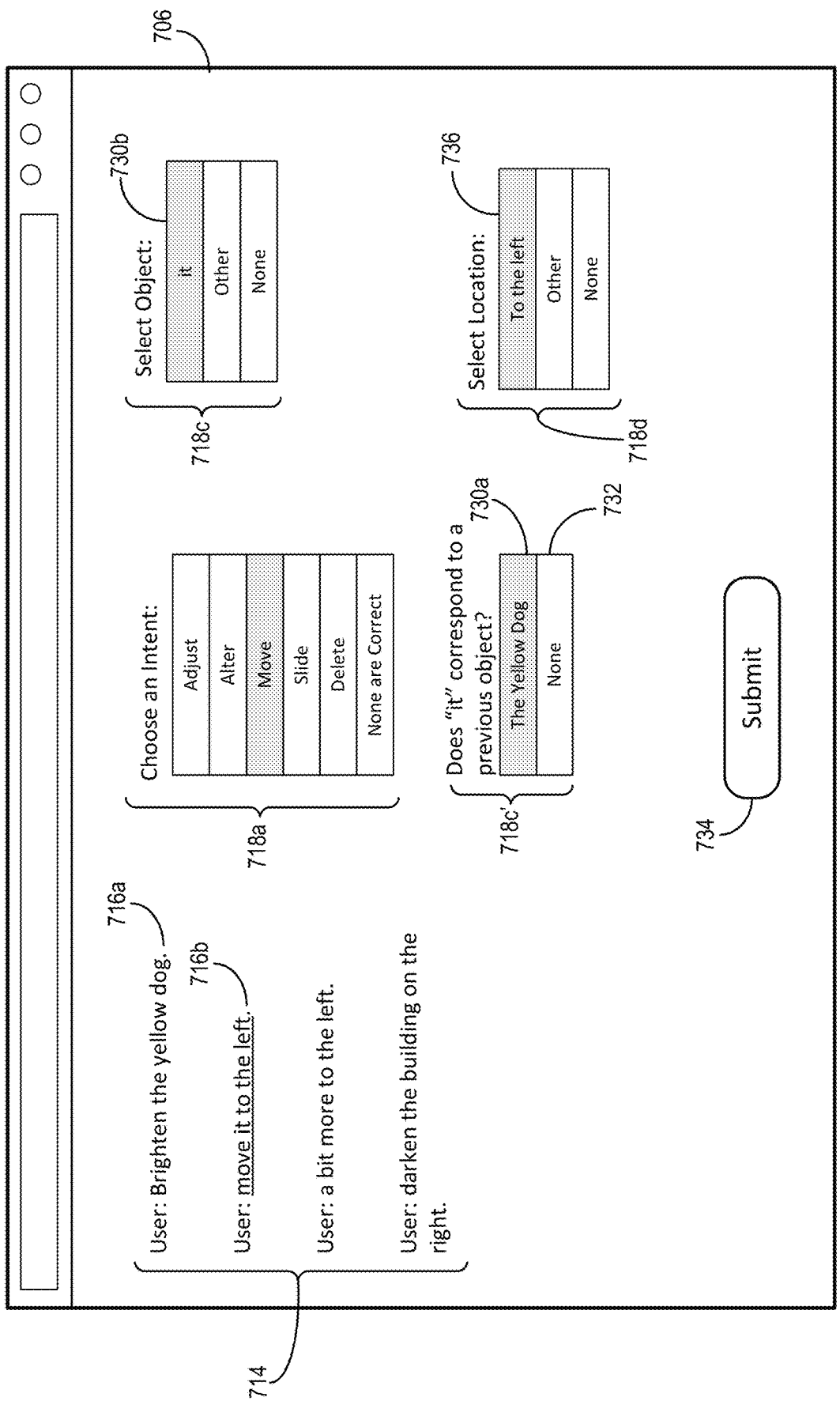
FIG. 8 illustrates an example interactive image editing dialogue annotation user interface in accordance with one or more embodiments.

For example, as shown in FIG. 8, in response to the digital image editing dialogue annotation system 102 identifying the target utterance 716b (e.g., "move it to the left") within the digital image editing dialogue 714, the digital image editing dialogue annotation system 102 provides the image editing annotation element 718a. In response to detecting a user selection of the canonical intent 722f, the digital image editing dialogue annotation system 102 can determine that there is no attribute associated with the intent "move," and provide the image editing annotation element 718c including the object 730b. In some embodiments, the digital image editing dialogue annotation system 102 can surface annotation elements in different orders (or at the same time).

For example, the digital image editing dialogue annotation system 102 can provide the object 730b, "it" (e.g., in response to an IOB tag associated with the target utterance 716b indicating "it" as a subject of the sentence and/or based on application of a machine learning model that predicts "it" is the top value for an object annotation). In response to a detected selection of the object 730b, the digital image editing dialogue annotation system 102 can attempt to resolve any co-reference issues by determining whether "it" corresponds to a previously tagged object. For example, in response to detecting a selection of the object 730b, as shown in FIG. 8, the digital image editing dialogue annotation system 102 can provide the image editing annotation element 718c' including the object 730a (e.g., the previously selected object "the yellow dog"). In response to detecting a selection of the object 730a in the image editing annotation element 718c', the digital image editing dialogue annotation system 102 can determine that "it" and "the yellow dog" are referencing the same object. As such, the digital image editing dialogue annotation system 102 can index the same object identifier to "it" as was previously indexed to "the yellow dog." In response to detecting a selection of the none option 732, the digital image editing dialogue annotation system 102 can index "it" to a new object identifier.

As shown in FIG. 8, the digital image editing dialogue annotation system 102 also provides the image editing annotation element 718d. The digital image editing dialogue annotation system 102 identifies "to the left" as part of the target utterance 716b indicative of a location (e.g., utilizing an IOB tagger and/or machine learning model that predicts a location from a target utterance). The digital image editing dialogue annotation system 102 then generates the location 736 within the image editing annotation element 718d. In response to detecting a selection of the location 736 within the image editing annotation element 718d, the digital image editing dialogue annotation system 102 can index "to the left" to a new location identifier.

In one or more embodiments, in response to detecting a selection of the submit button 734, the digital image editing dialogue annotation system 102 can generate the ground truth annotation associated with the target utterance 716b by generating an initial annotation of surface terms in the target utterance 716b, determining frame information for the target utterance 716b, and then mapping the initial annotation to one or more slots in an annotation ontology along with the frame information. For example, the digital image editing dialogue annotation system 102 can generate the following initial annotation based on user input received via the image editing dialogue annotation user interface 706 in combination with IOB tags associated with the target utterance 716b:

"intent(move): [action: move] [object(1):it] [location(1): to the left]"

Additionally, the digital image editing dialogue annotation system 102 determines frame information associated with the target utterance 716b. As discussed above, the digital image editing dialogue annotation system 102 utilizes a frame structure to track conversational states within the digital image editing dialogue 714. As such, once the digital image editing dialogue annotation system 102 generates a ground truth annotation for a first target utterance (e.g., the target utterance 716a) in the digital image editing dialogue 714, the digital image editing dialogue annotation system 102 can generate frame information associated with additional target utterances in the digital image editing dialogue 714. In an alternative embodiment, the digital image editing dialogue annotation system 102 can determine frame information associated with a target utterance based on user input via more or more additional display elements.

For example, the digital image editing dialogue annotation system 102 can determine to start a new frame when the topic of a target utterance changes from the topic of a previous target utterance in a dialogue. In one or more embodiments, the digital image editing dialogue annotation system 102 determines that a topic change has occurred when an intent, object, or location changes from one target utterance to the next. To illustrate, the digital image editing dialogue annotation system 102 may determine that a topic change has occurred between the target utterance 716a and the target utterance 716b because the intent changes from "adjust" (e.g., as determined relative to the target utterance 716a) to "move" (e.g., as determined relative to the target utterance 716b). In response to this determination, the digital image editing dialogue annotation system 102 can determine to include the ground truth annotation associated with the target utterance 716b in a new frame.

With the initial annotation of surface terms in the target utterance 716b and associated frame information, the digital image editing dialogue annotation system 102 generates a ground truth annotation for the target utterance 716b (e.g., "move it to the left") as follows:

{active_frame_id: 2, Frames:[{frame_id:2, Frame_ref_id: 1, intent:move, slots:[{object_id: 1},{location_id: 1}]}]}

FIG. 9 illustrates user selections relative to the target utterance 716c within the digital image editing dialogue 714. As shown in FIG. 9, the digital image editing dialogue annotation system 102 provides the first object for display ("the yellow dog") associated with a particular index in the image editing annotation element 718c. For example, as discussed above, at this point in the digital image editing dialogue 714, the digital image editing dialogue annotation system 102 has indexed "the yellow dog" and "it" to the same object identifier. Thus, the digital image editing dialogue annotation system 102 may provide the first object (e.g., "the yellow dog") in the image editing annotation element 718c, so as to avoid confusion.

Additionally, as shown in FIG. 9, the digital image editing dialogue annotation system 102 can provide the image editing annotation element 718e in response to one or more IOB tags indicating a magnitude of an action. For example, the digital image editing dialogue annotation system 102 can include "+" in the image editing annotation element 718e in response to detecting an IOB tag associated with the word "more" in the target utterance 716c.

In one or more embodiments, in response to detecting a selection of the submit button 734, the digital image editing dialogue annotation system 102 can generate the ground truth annotation associated with the target utterance 716c by generating an initial annotation of surface terms in the target utterance 716c, determining frame information for the target utterance 716c, and then mapping the initial annotation to one or more slots in an annotation ontology along with the frame information. For example, the digital image editing dialogue annotation system 102 can generate the following initial annotation based on user input received via the image editing dialogue annotation user interface 706 in combination with IOB tags associated with the target utterance 716:

"intent(move): [value: a bit more] [location(1): to the left]"

The digital image editing dialogue annotation system 102 can also determine that the current target utterance 716c shares a topic with the previous target utterance 716b. For example, the active target utterance 716c features a location (e.g., "to the left") that is the same as the location featured in the previous target utterance 716b (e.g., "to the left"). Additionally, the active target utterance 716c features no additional new intents or objects. Thus, the digital image editing dialogue annotation system 102 can determine that the active target utterance 716c includes the same topic as the previous target utterance 716b and generate corresponding frame information associated with the target utterance 716c.

In response to detecting a user selection of the submit button 734, the digital image editing dialogue annotation system 102 can generate the following ground truth annotation associated with the target utterance 716c (e.g., "a bit more to the left"):

{active_frame_id: 2, Frames:[{frame_id:2, Frame_ref_id: 1, intent:move, slots:[{object_id: 1}, {location_id: 1}, {value:+}] }]}

FIG. 10 illustrates user selections relative to the target utterance 716d within the digital image editing dialogue 714. In one or more embodiments, in response to detecting a selection of the submit button 734, the digital image editing dialogue annotation system 102 can generate the ground truth annotation associated with the target utterance 716d by generating an initial annotation of surface terms in the target utterance 716d, determining frame information for the target utterance 716d, and then mapping the initial annotation to one or more slots in an annotation ontology along with the frame information. For example, the digital image editing dialogue annotation system 102 can generate the following initial annotation based on user input received via the image editing dialogue annotation user interface 706 in combination with IOB tags associated with the target utterance 716:

"intent(adjust): [action: darken] [object(2): the building on the right]"

Additionally, the digital image editing dialogue annotation system 102 can determine that the current target utterance 716d does not share a topic with the previous target utterance 716c. For example, the active target utterance 716d includes an object (e.g., "the building on the left") that has not been previously indexed. As such, the digital image editing dialogue annotation system 102 can determine that the target utterance 716d does not include the same topic as the previous target utterance 716c.

In response to detecting a user selection of the submit button 734, the digital image editing dialogue annotation system 102 can generate the following ground truth annotation associated with the target utterance 716d (e.g., "darken the building on the right"):

{active_frame_id: 3, Frames:[{frame_id:3, Frame_ref_id 2, intent:adjust, slots:[{attribute:brightness}, {object_id:2},{value: -}]}]}

Although FIGS. 7A-10 illustrate specific digital image editing annotation elements, the digital image editing dialogue annotation system 102 can utilize a variety of different digital image editing annotation elements corresponding to the same or different annotation slots or values. For example, in addition to the digital image editing annotation elements illustrated in FIGS. 7A-10, the digital image editing dialogue annotation system 102 can generate a frame annotation element (e.g., an element that asks for user input to identify frames for target utterances in a digital image editing dialogue).

Moreover, although FIGS. 7A-10 illustrate specific forms of object annotation elements and location annotation elements, the digital image editing dialogue annotation system 102 can use alternative user interface elements. For example, in one or more embodiments, the digital image editing dialogue annotation system 102 utilizes an object annotation element that prompts the user to select (e.g., click) common objects within a digital image editing dialogue (e.g., click "the yellow dog" and "it"). Similarly, the digital image editing dialogue annotation system can utilize a location annotation element that prompts the user to select (e.g., click) common locations within a digital image editing dialogue. Indeed, in one or more embodiments, the digital image editing dialogue annotation system performs IOB tagging and user input of locations and frames as part of an separate (e.g., initial) annotation sequence (e.g., before asking for user input with regard to intent or other ontology slots).

Figure 11:
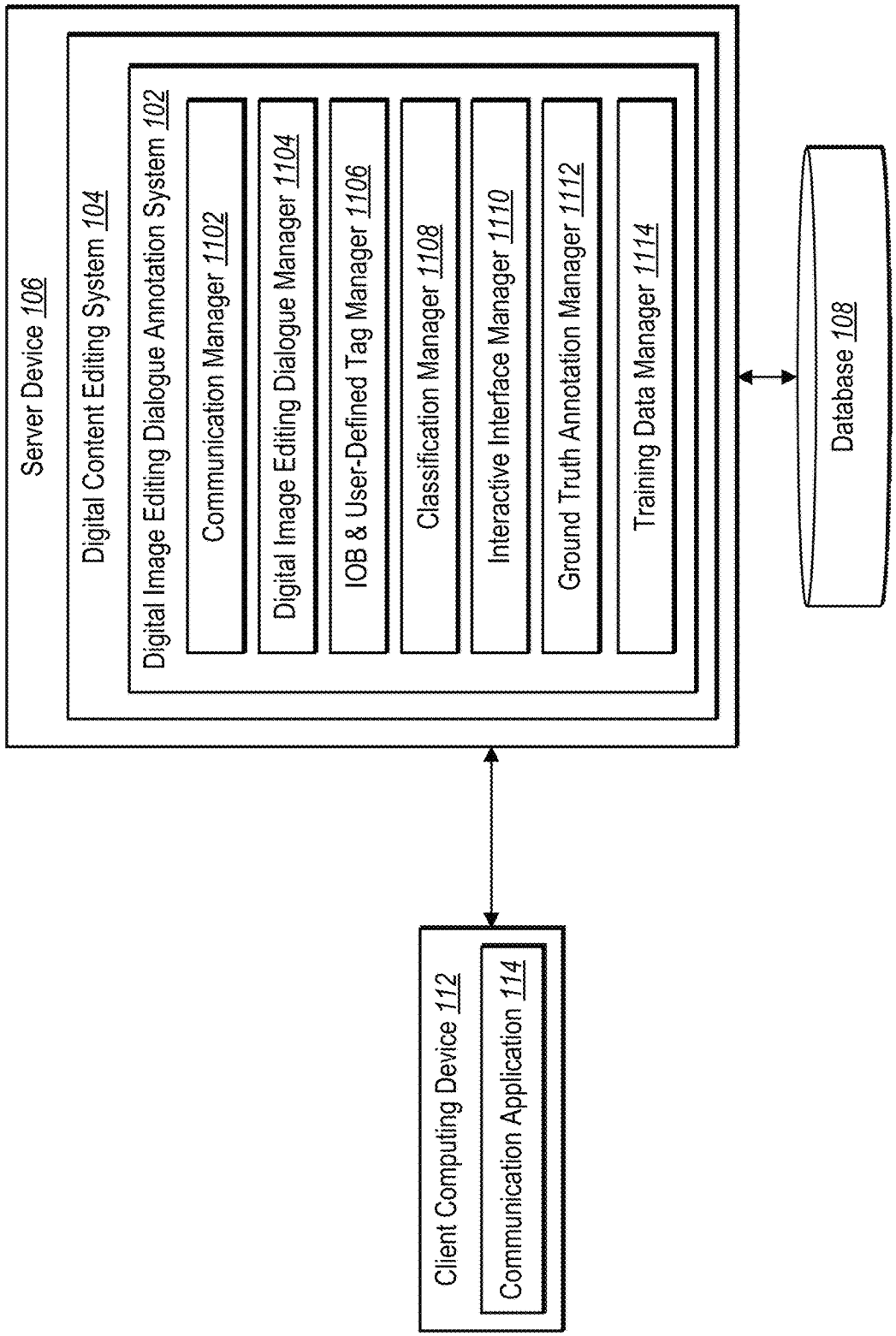
FIG. 11 illustrates a schematic diagram of the digital image editing dialogue annotation system in accordance with one or more embodiments.

As described in relation to FIGS. 1-10, the digital image editing dialogue annotation system 102 generates ground truth annotations of target utterances from digital image editing dialogues in order to create state-driven training data sets. FIG. 11 illustrates a detailed schematic diagram of an embodiment of the digital image editing dialogue annotation system 102 described above. Although illustrated on the server device 106, as mentioned above, the digital image editing dialogue annotation system 102 can be implemented by one or more different or additional computing devices (e.g., the client computing device 112). In one or more embodiments, the digital image editing dialogue annotation system 102 includes a communication manager 1102, a digital image editing dialogue manager 1104, an IOB manager 1106, a classification manager 1108, an interactive interface manager 1110, a ground truth annotation manager 1112, and a training data manager 1114.

Each of the components 1102-1114 of the digital image editing dialogue annotation system 102 can include software, hardware, or both. For example, the components 1102-1114 can include one or more instructions stored on a computer-readable storage medium and executable by processors of one or more computing devices, such as a client device or server device. When executed by the one or more processors, the computer-executable instructions of the digital image editing dialogue annotation system 102 can cause the computing device(s) to perform the methods described herein. Alternatively, the components 1102-1114 can include hardware, such as a special-purpose processing device to perform a certain function or group of functions. Alternatively, the components 1102-1114 of the digital image editing dialogue annotation system 102 can include a combination of computer-executable instructions and hardware.

Furthermore, the components 1102-1114 of the digital image editing dialogue annotation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1114 may be implemented as a stand-alone application, such as a desktop or mobile application. Furthermore, the components 1102-1114 may be implemented as one or more web-based applications hosted on a remote server. The components 1102-1114 may also be implemented in a suite of mobile device applications or "apps." To illustrate, the components 1102-1114 may be implemented in an application, including but not limited to ADOBE CREATIVE CLOUDE, ADOBE PHOTOSHOP, ADOBE ACROBAT, ADOBE ILLUSTRATOR, and ADOBE INDESIGN. "ADOBE", "CREATIVE CLOUD," "PHOTOSHOP," "ACROBAT," "ILLUSTRATOR," and "INDESIGN" are either registered trademarks or trademarks of Adobe Inc. in the United States and/or other countries.

As mentioned above, and as shown in FIG. 11, the digital image editing dialogue annotation system 102 includes a communication manager 1102. In one or more embodiments, the communication manager 1102 handles communications between the digital image editing dialogue annotation system 102 and other computing devices. For example, the communication manager 1102 can send and receive information to and from the client computing device 112. To illustrate, the communication manager 1102 can provide digital image editing dialogues, interface elements, and other information to the client computing device 112. The communication manager 1102 can also receive indications of user selections and user-defined terms form the client computing device 112. As mentioned above, in one or more embodiments, the communication manager 1102 can send and receive information to the client computing device 112 via the communication application 114 installed on the client computing device 112.

As mentioned above, and as shown in FIG. 11, the digital image editing dialogue annotation system 102 includes a digital image editing dialogue manager 1104. In one or more embodiments, the digital image editing dialogue manager 1104 handles the selection of digital image editing dialogues. For example, the digital image editing dialogue manager 1104 can analyze a repository of digital image editing dialogues (e.g., stored in the database 108) and identify digital image editing dialogues that have not been annotated and provide the identified digital image editing dialogue for annotation. Additionally, the digital image editing dialogue manager 1104 parses digital image editing dialogues prior to annotation. For example, the digital image editing dialogue manager 1104 can parse a digital image editing dialogue into one or more target utterances (e.g., sentences).

As mentioned above, and as shown in FIG. 11, the digital image editing dialogue annotation system 102 includes an IOB manager 1106. In one or more embodiments, the IOB manager 1106 handles the IOB tagging process in connection with a target utterance. As such, the IOB manager 1106 can train and maintain one or more IOB taggers (e.g., machine learning models that generate IOB tags), and can apply the one or more IOB taggers to a target utterance in order to generate one or more IOB tags for the target utterance.

Additionally, the IOB manager 1106 can combine receives user input with IOB tags to generate IOB outputs. For example, prior to the generation of a ground truth utterance, the IOB manager 1106 can receive user input via an image editing dialogue annotation user interface. The IOB manager 1106 can then combine user inputs with IOB tagged surface terms from a target utterance to generate an initial annotation of the surface terms in the target utterance. This IOB output, or initial annotation, can be utilized by other components of the digital editing dialogue annotation system 102 to generate a ground truth annotation for the target utterance.

As mentioned above, and as shown in FIG. 11, the digital image editing dialogue annotation system 102 includes a classification manager 1108. In one or more embodiments, the classification manager 1108 trains, maintains, and utilizes one or more image editing classification neural networks. For example, the classification can train an image editing intent classification neural network with intent training data to approximate unknown functions. To illustrate, the classification manager 1108 can apply an image editing intent classification neural network to intent training data, and then compare outputs of the image editing intent classification neural network to ground truths. Based on that comparison, the classification manager 1108 can modify internal parameters of the image editing intent classification neural network for subsequent predictions. The classification manager 1108 can similarly train other image editing classification neural networks to predict attributes, objects, locations, colors, and other ontological categories.

Additionally, the classification manager 1108 can utilize trained image editing classification neural networks. For example, as discussed above, the classification manager 1108 can apply a trained image editing intent classification neural network to a target utterance to predict five top intents associated with that target utterance. In additional or alternative embodiments, the classification manager 1108 can similarly utilize trained image editing classification neural networks to predict any threshold number of likely intents, attributes, objects, locations, colors, or other ontological categories.

As mentioned above, and as shown in FIG. 11, the digital image editing dialogue annotation system 102 includes an interactive interface manager 1110. In one or more embodiments, the interactive interface manager 1110 generates and provides image editing annotation elements for display via an image editing dialogue annotation user interface. For example, the interactive interface manager 1110 can generate an intent image editing annotation element (e.g., the intent image editing annotation element 718*a*). The interactive interface manager 1110 can generate image editing annotation elements associated with attributes, objects, locations, increase/decrease values, and colors in a similar manner. Additionally, as illustrated in FIGS. 7A-7F, the interactive interface manager 1110 can generate and provide interface elements incrementally based on user input. Alternatively, the interactive interface manager 1110 can generate and provide interface elements in a single user interface.

As mentioned above, and as shown in FIG. 11, the digital image editing dialogue annotation system 102 includes a ground truth annotation manager 1112. In one or more embodiments, the ground truth annotation manager 1112 generates a ground truth annotation corresponding to a target utterance by determining frame information and mapping surface forms (and/or an initial annotation of target utterance) to one or more slots in an annotation ontology. As discussed above, the ground truth annotation manager 1112 generates a ground truth annotation in response to a signal received via the image editing dialogue annotation user interface 706 such as a detected selection of the submit button 734, or a detected selection relative to a final image editing annotation element.

In one or more embodiment, the ground truth annotation manager 1112 can also identify a speaker associated with a target utterance and generate a ground truth annotation in light of the identified speaker. For example, the ground truth annotation manager 1112 can determine that the speaker associated with a target utterance is a digital image editing system (e.g., ADOBE PHOTOSHOP) based on the target utterance including a suggestion (e.g., "I suggest using cloning.") or a confirmation (e.g., "do you want me to crop the image?").

In at least one embodiment, in response to determining that the speaker of a target utterance is the digital image editing system, the ground truth annotation manager 1112 can generate a ground truth annotation that includes no frame information. For example, in response to determining that a digital image editing system target utterance is a suggestion, the ground truth annotation manager 1112 can generate a ground truth annotation that includes an intent ontology slot and slot value. To illustrate, the ground truth annotation manager 1112 can generate a ground truth annotation for the target utterance "I suggest using cloning" as "{intent:clone}." In response to determining that a digital image editing system target utterance is a confirmation (e.g., "do you want me to crop the image?"), the ground truth annotation manager 1112 can generate a ground truth annotation that includes at least an intent ontology slot and slot value in addition to other values (e.g., "{intent:crop, object_id: 0}").

The ground truth annotation manager 1112 can also determine that the speaker associated with a target utterance is a user. In response to determining that the target utterance speaker is the user, the ground truth annotation manager 1112 generates a ground truth annotation with the target utterance to include frame information. For example, the ground truth annotation manager 1112 can determine frame information for a ground truth annotation based on the following rules:

A frame identifier is an integer that starts at 1 with each new digital image editing dialogue. If there is only one frame, the frame identifier (e.g., "frame_id") and active frame identifier (e.g., "active_frame_id) are the same. If there is more than one frame, the active frame identifier represents only the current frame.

A frame reference identifier (e.g., "frame_ref_id") is the frame identifier of the parent frame which is the previous chronological frame.

In addition to training a digital image editing dialogue machine learning model, the digital image editing dialogue annotation system 102 can utilize different frame identifiers to allow an annotator (or other user) to navigate between different topics or to the As mentioned above, and as shown in FIG. 11, the digital image editing dialogue annotation system 102 includes a training data manager 1114. In one or more embodiments, the training data manager 1114 adds generated ground truth annotations and corresponding target utterances to a training data set for training an image editing dialogue machine learning model (e.g., stored within the database 108). Additionally, the training data manager 1114 can train an image editing dialogue machine learning model with the training data set utilizing the machine learning model training techniques discussed above.

Figure 12:
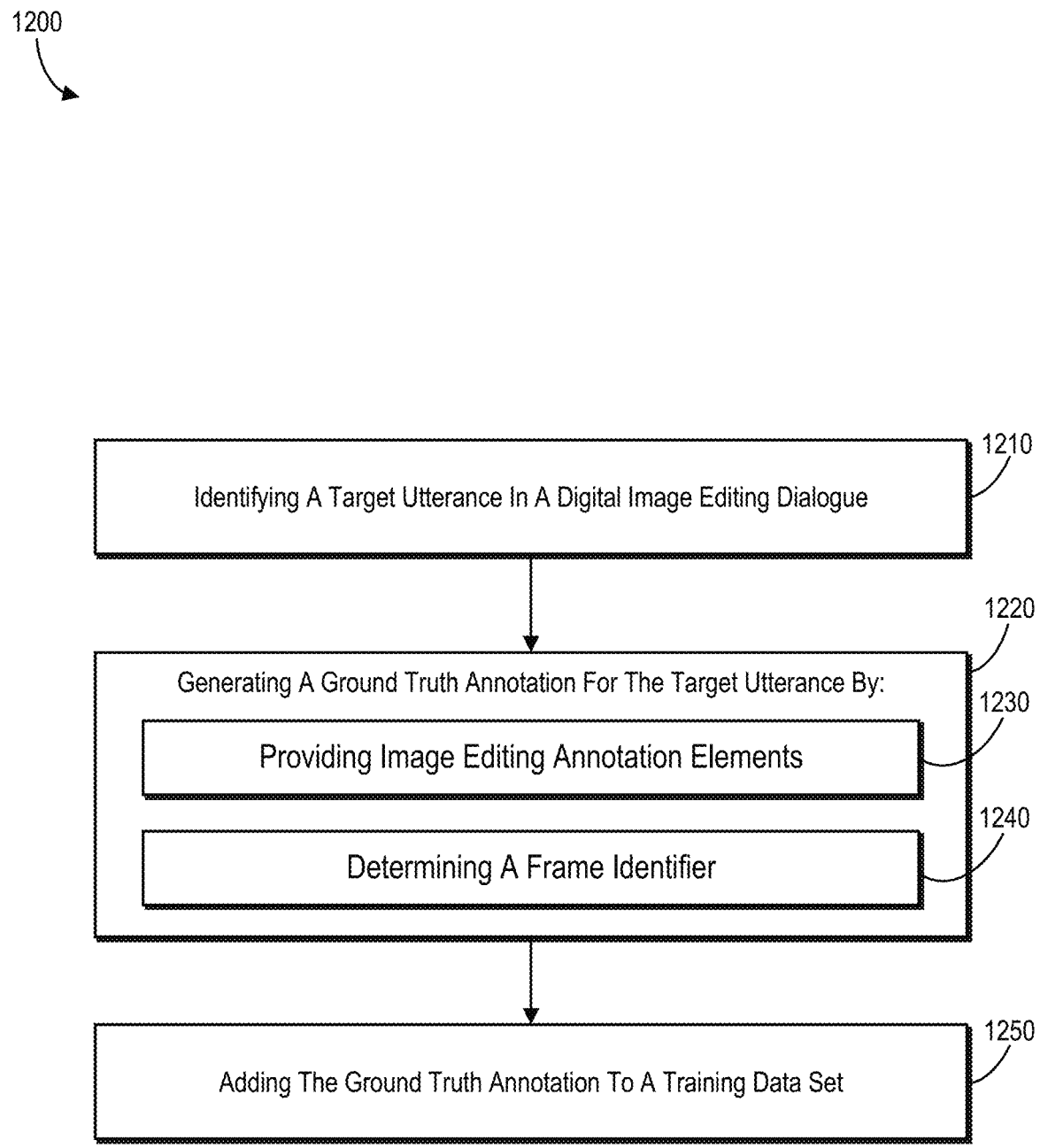
FIG. 12 illustrates a flowchart of a series of acts for generating a ground truth annotation of a target utterance in accordance with one or more embodiments.
Figure 13:
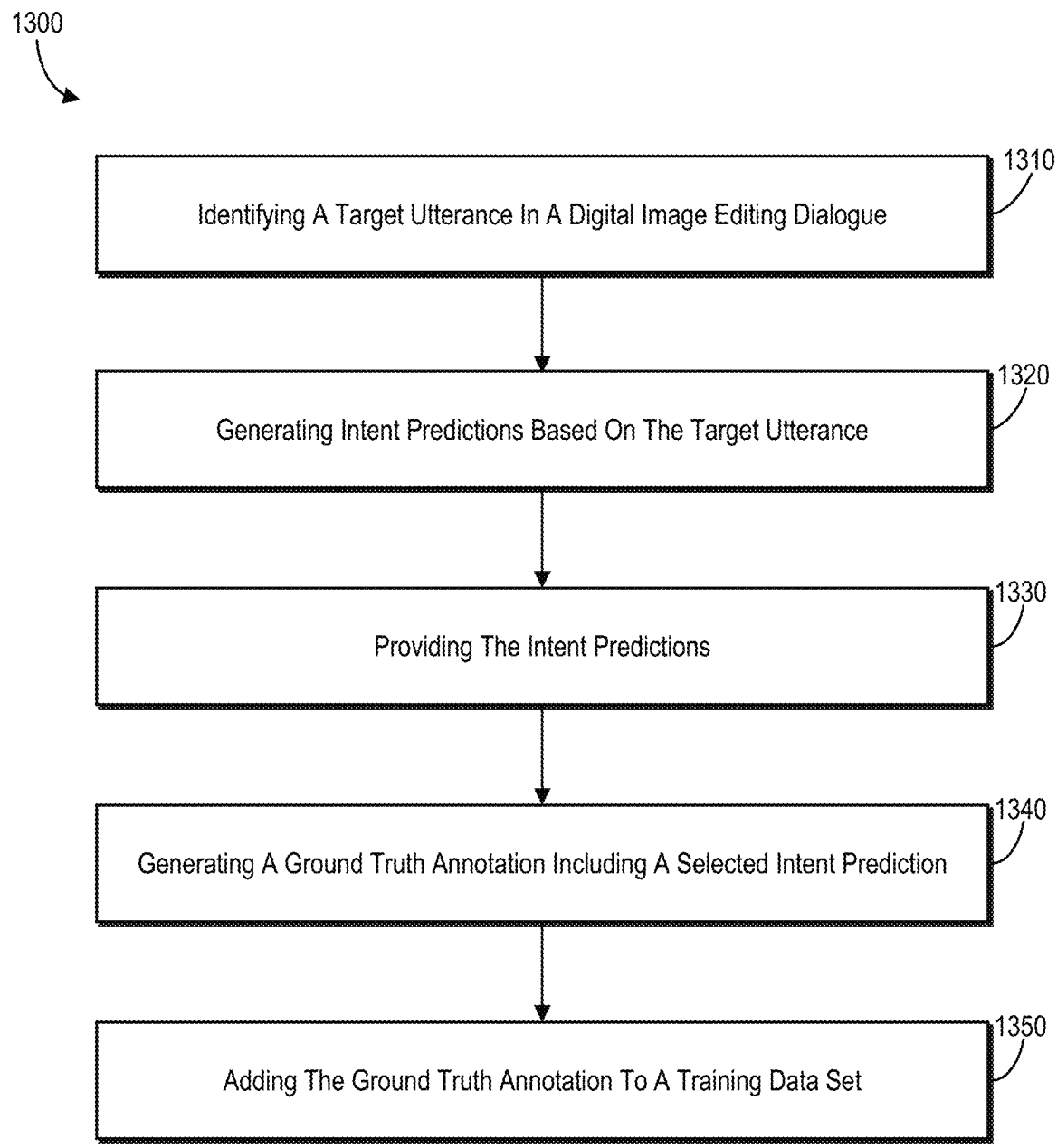
FIG. 13 illustrates a flowchart of a series of acts for utilizing an intent prediction in generating a ground truth annotation of a target utterance in accordance with one or more embodiments.

FIGS. 1-11, the corresponding text, and the examples provide a number of different methods, systems, devices, and non-transitory computer-readable media of the digital image editing dialogue annotation system 102. In addition to the foregoing, one or more embodiments can also be described in terms of flowcharts comprising acts for accomplishing a particular result, as shown in FIGS. 12 and 13. FIGS. 12 and 13 may be performed with more or fewer acts. Further, the acts may be performed in differing orders. Additionally, the acts described herein may be repeated or performed in parallel with one another or parallel with different instances of the same or similar acts.

As mentioned, FIG. 12 illustrates a flowchart of a series of acts 1200 for generating a ground truth annotation associated with a target utterance in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

As shown in FIG. 12, the series of acts 1200 includes an act 1210 of identifying a target utterance in a digital image editing dialogue. For example, the act 1210 can involve identifying a target utterance in a digital image editing dialogue, the digital image editing dialogue including digital communications from a user for editing a digital image.

Additionally, the series of acts 1200 includes an act 1220 of generating a ground truth annotation for the target utterance. For example, the act 1220 can involve generating a ground truth annotation for the target utterance of the digital image editing dialogue. In one or more embodiments, the act 1220 also includes the acts 1230 and 1240 of providing image editing annotation elements, and determining a frame identifier, respectively. For example, the act 1230 can involve providing, for display via an image editing dialogue annotation user interface, a plurality of image editing annotation elements and the target utterance. In one or more embodiments, the plurality of image editing annotation elements include a frame identifier image editing annotation element, an intent image editing annotation element, an object identifier image editing annotation element, and a location identifier image editing annotation element.

Additionally, the act 1240 can involve, based on user interaction with the plurality of image editing annotation elements, determining a frame identifier corresponding to the target utterance and a ground truth image editing intent corresponding to the target utterance. Then, the act 1220 of generating a ground truth annotation for the target utterance can further include generating the ground truth annotation for the target utterance based on the frame identifier and the ground truth image editing intent.

In one or more embodiments, the ground truth annotation includes a plurality of values corresponding to an annotation ontology, the annotation ontology comprising ontology slots. For example, the ontology slots include a pre-defined ontology slot that accepts pre-defined canonical forms, and an open-ended ontology slot that accepts open-ended values. In at least one embodiment, generating the ground truth annotation includes: populating the pre-defined ontology slot based on user selection of a pre-defined image editing annotation element from the plurality of image editing annotation elements, and populating the open-ended ontology slot based on user entry of a text input via an open-ended image editing annotation element of the plurality of image editing annotation elements.

In one or more embodiments, generating the ground truth annotation for the target utterance can include: generating a plurality of IOB tags associated with the target utterance, and mapping the plurality of IOB tags and the surface terms to a canonical form corresponding to a slot within the annotation ontology. Additionally, in at least one embodiment, the series of acts 1200 includes, based on the user interaction with the plurality of image editing annotation elements, determining one or more of: an object identifier corresponding to the target utterance, a location identifier corresponding to the target utterance, and an attribute corresponding to the target utterance.

In at least one embodiment, the series of acts 1200 further includes an act of determining a speaker associated with the target utterance. In at least one embodiment, in response to determining that the speaker is a user, the series of acts 1200 includes determining an active frame identifier associated with the target utterance, wherein the active frame identifier is one of an existing frame identifier within the training data set or a new frame identifier, and further generating the ground truth annotation for the target utterance based on the active frame identifier. Additionally, in at least one embodiment, in response to determining that the speaker is a digital image editing system, the series of acts 1200 includes based on a determination that the target utterance is a suggestion statement, determining a suggestion slot value associated with the target utterance, and generating the ground truth annotation for the target utterance based on the suggestion slot value.

Furthermore, in one or more embodiments, the series of acts 1200 includes an act 1250 of adding the ground truth annotation to a training data set. For example, the act 1250 can involve adding the target utterance and the ground truth annotation to a training data set for training an image editing dialogue machine learning model.

Moreover, the series of act 1200 can include acts of: identifying a second target utterance in the digital image editing dialogue, generating a second ground truth annotation for the second target utterance of the digital image editing dialogue by, based on user interaction with the plurality of image editing annotation elements relative to the second target utterance, determining a frame identifier corresponding to the second target utterance and a ground truth image editing intent corresponding to the second target utterance, and adding the second target utterance and the second ground truth annotation to the training data set for training an image editing dialogue machine learning model.

As mentioned, FIG. 13 illustrates a flowchart of a series of acts 1300 for generating a ground truth annotation based on an intent prediction in accordance with one or more embodiments. While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer-readable medium can comprise instructions that, when executed by one or more processors, cause a computing device to perform the acts of FIG. 13. In some embodiments, a system can perform the acts of FIG. 13.

As shown in FIG. 13, the series of acts 1300 includes an act 1310 of identifying a target utterance in a digital image editing dialogue. For example, the act 1310 can involve identifying a target utterance in a digital image editing dialogue, the digital image editing dialogue comprising digital communications from a user for editing a digital image.

As further shown in FIG. 13, the series of acts 1300 includes an act 1320 of generating intent predictions based on the target utterance. For example, the act 1320 can involve generating a plurality of intent predictions based on the target utterance utilizing an image editing intent classification neural network trained with image editing command annotations.

The series of acts 1300 also includes an act 1330 of providing the intent predictions. For example, the act 1330 can involve providing, for display via an image editing dialogue annotation user interface, the plurality of intent predictions and the target utterance. In at least one embodiment, the series of acts 1300 can further include providing, for display via the image editing dialogue annotation user interface, an open-ended intent control in addition to the plurality of intent predictions. For instance, in one embodiment, the series of acts can include based on receiving text input via the open-ended intent control, modifying an annotation ontology associated with the digital image editing dialogue to include an additional pre-defined ontology slot corresponding to the text input.

The series of acts 1300 further includes an act 1340 of generating a ground truth annotation including a selected intent prediction. For example, the act 1340 can involve generating a ground truth annotation comprising an intent corresponding to the target utterance based on user interaction with an intent from the plurality of intent predictions via the image editing dialogue annotation user interface. In at least one embodiment, the series of acts 1300 includes generating the ground truth annotation based on user interactions associated with the one or more image editing annotation elements, wherein the one or more image editing annotation elements are associated with one or more of a frame identifier, an object identifier, or a location identifier.

As further shown in FIG. 13, the series of acts 1300 includes an act 1350 of adding the ground truth annotation to a training data set. For example, the act 1350 can involve adding the target utterance and the ground truth annotation to a training data set for training a digital image editing dialogue machine learning model.

In addition (or in the alternative) to the acts described above, in some embodiments, the acts 1200 and/or the acts 1300 include a step for generating a ground truth annotation of the target utterance in the digital image editing dialogue from user interaction with an image editing dialogue annotation user interface. For example, the algorithm and acts described above in relation to FIGS. 2, 6 can comprise the corresponding acts for a step for generating a ground truth annotation of the target utterance in the digital image editing dialogue from user interaction with an image editing dialogue annotation user interface.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 14:
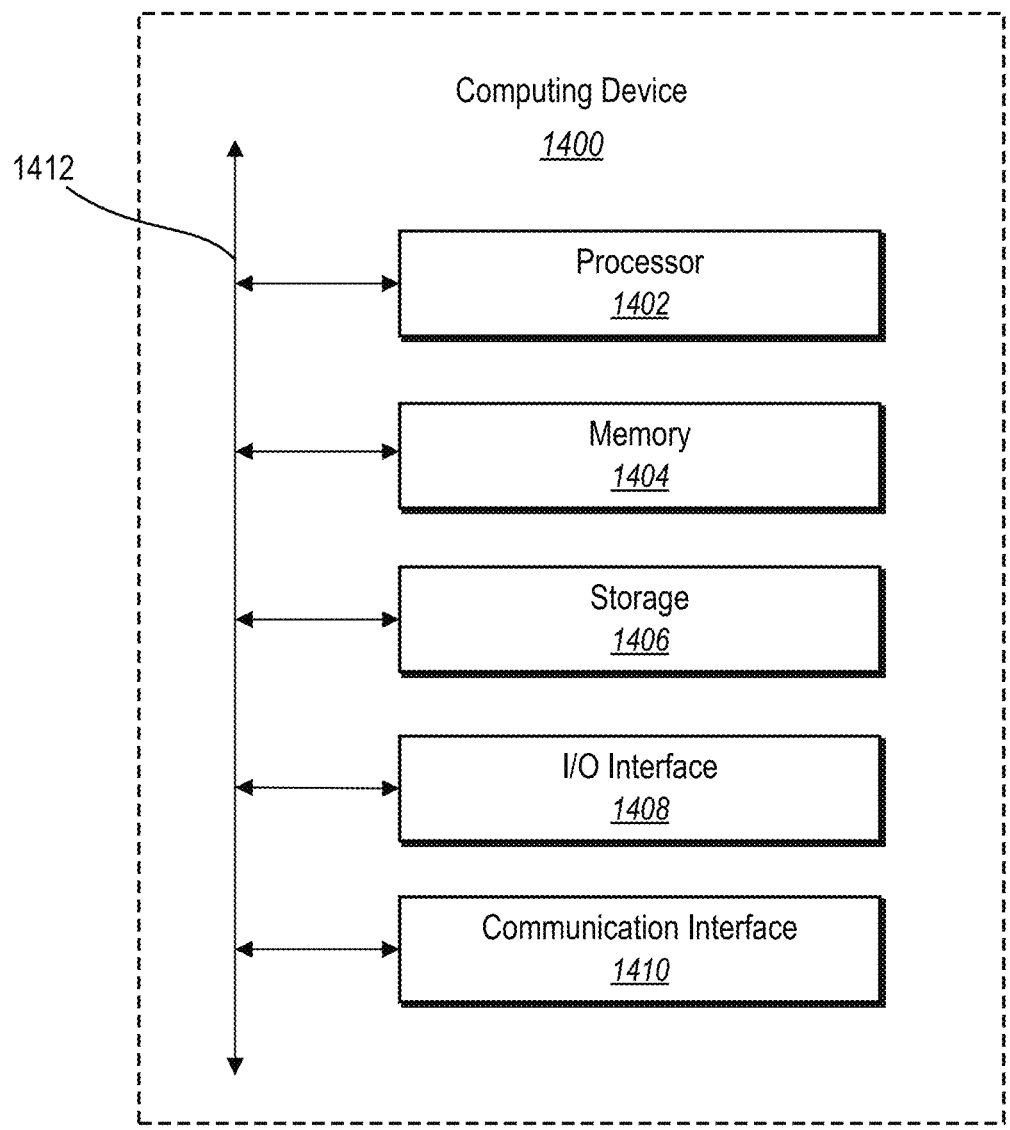
FIG. 14 illustrates a block diagram of an example computing device in accordance with one or more embodiments.

FIG. 14 illustrates a block diagram of an example computing device 1400 that may be configured to perform one or more of the processes described above. One will appreciate that one or more computing devices, such as the computing device 1400 may represent the computing devices described above (e.g., the server device 106, and the client computing devices 112). In one or more embodiments, the computing device 1400 may be a mobile device (e.g., a mobile telephone, a smartphone, a PDA, a tablet, a laptop, a camera, a tracker, a watch, a wearable device, etc.). In some embodiments, the computing device 1400 may be a non-mobile device (e.g., a desktop computer or another type of client device). Further, the computing device 1400 may be a server device that includes cloud-based processing and storage capabilities.

As shown in FIG. 14, the computing device 1400 can include one or more processor(s) 1402, memory 1404, a storage device 1406, input/output interfaces 1408 (or "I/O interfaces 1408"), and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

We claim:

1. A computer-implemented method comprising:
   in response to a detected user selection of an utterance within a digital image editing dialogue, identifying the utterance as a target utterance from the digital image editing dialogue, the digital image editing dialogue comprising digital verbal communications from a user for editing a digital image;
   generating a ground truth annotation for the target utterance of the digital image editing dialogue by:
      providing, for display via an image editing dialogue annotation user interface, a plurality of image editing annotation elements and the target utterance;
      based on user interactions with the plurality of image editing annotation elements, determining a frame identifier reflecting a shared topic between the target utterance and other digital verbal communications in the digital image editing dialogue, and a ground truth image editing intent corresponding to the target utterance;

determining a speaker associated with the target utterance; and based on the speaker associated with the target utterance, generating the ground truth annotation for the target utterance including: the frame identifier reflecting the shared topic between the target utterance and other digital verbal communications in the digital image editing dialogue, and the ground truth image editing intent; and adding the ground truth annotation and the target utterance of the digital image dialogue to a training data set for training a digital image editing dialogue machine learning model to learn co-reference resolution and user intent tracking over multiple conversational turns in a new digital image editing dialogue.

2. The computer-implemented method as recited in claim 1, wherein the ground truth annotation of the target utterance additionally comprises at least one of: a location identifier relative to the digital image, or an object identifier relative to the digital image.

3. The computer-implemented method as recited in claim 1, wherein
the training data set comprises a second ground truth annotation corresponding to a second target utterance from the digital image editing dialogue, the second ground truth annotation comprising the frame identifier.

4. The computer-implemented method as recited in claim 3, wherein the frame identifier reflects the shared topic by comprising at least one of: a common ground truth intent corresponding to both the target utterance and the second target utterance, a common object identifier corresponding to both the target utterance and the second target utterance, or a common location identifier corresponding to both the target utterance and the second target utterance.

5. The computer-implemented method as recited in claim 1, wherein the training data set comprises multiple frames for multiple target utterances of the digital image editing dialogue, and each frame corresponds to a unique ground truth intent, a unique object identifier, or a unique location identifier.

6. A non-transitory computer-readable storage medium storing instructions thereon that, when executed by at least one processor, cause a system to:
in response to a detected selection of an utterance within a digital image editing dialogue within an image editing dialogue annotation user interface, identify the utterance as a target utterance from the digital image editing dialogue, the digital image editing dialogue comprising digital verbal communications from a user for editing a digital image;

generate a ground truth annotation for the target utterance of the digital image editing dialogue by:
providing, for display via the image editing dialogue annotation user interface, a plurality of image editing annotation elements and the target utterance;
based on user interactions with the plurality of image editing annotation elements, determining a frame identifier reflecting a shared topic between the target utterance and other digital verbal communications in the digital image editing dialogue, and a ground truth image editing intent corresponding to the target utterance;
determining a speaker associated with the target utterance; and
based on the speaker associated with the target utterance, generating the ground truth annotation for the target utterance including: the frame identifier reflecting the shared topic between the target utterance and other digital verbal communications in the digital image editing dialogue, and the ground truth image editing intent; and
add the target utterance and the ground truth annotation to a training data set for training an image editing dialogue machine learning model to learn co-reference resolution and user intent tracking over multiple conversational turns in a new digital image editing dialogue.

7. The non-transitory computer-readable storage medium as recited in claim 6, wherein the ground truth annotation comprises a plurality of values corresponding to an annotation ontology, the annotation ontology comprising ontology slots.

8. The non-transitory computer-readable storage medium as recited in claim 7, wherein the ontology slots comprise a pre-defined ontology slot that accepts pre-defined canonical forms and an open-ended ontology slot that accept open-ended values.

9. The non-transitory computer-readable storage medium as recited in claim 8, further storing instructions thereon that, when executed by the at least one processor, cause the system to generate the ground truth annotation by:
populating the pre-defined ontology slot based on user selection of a pre-defined image editing annotation element from the plurality of image editing annotation elements; and
populating the open-ended ontology slot based on user entry of a text input via an open-ended image editing annotation element of the plurality of image editing annotation elements.

10. The non-transitory computer-readable storage medium as recited in claim 7, further storing instructions thereon that, when executed by the at least one processor, cause the system to generate the ground truth annotation for the target utterance by:
generating IOB tags associated with the target utterance; and
mapping one or more of the IOB tags to a canonical form corresponding to a slot within the annotation ontology.

11. The non-transitory computer-readable storage medium as recited in claim 6, wherein the plurality of image editing annotation elements comprise a frame identifier image editing annotation element, an intent image editing annotation element, an object identifier image editing annotation element, and a location identifier image editing annotation element.

12. The non-transitory computer-readable storage medium as recited in claim 11, further storing instruction thereon that, when executed by the at least one processor, cause the system to, in response to determining that the speaker is a user:
determine an active frame identifier reflecting a topic corresponding to the target utterance, wherein the active frame identifier is different from the determined frame identifier; and
further generate the ground truth annotation for the target utterance based on the active frame identifier.

13. The non-transitory computer-readable storage medium as recited in claim 12, further storing instructions thereon that, when executed by the at least one processor, cause the system to, in response to determining that the speaker is a digital image editing system:
based on a determination that the target utterance is a suggestion statement, determine a suggestion slot value associated with the target utterance; and generate the ground truth annotation for the target utterance based on the suggestion slot value.

14. The non-transitory computer-readable storage medium as recited in claim 6, further storing instructions thereon that, when executed by the at least one processor, cause the system to, based on the user interaction with the plurality of image editing annotation elements, determine one or more of: an object identifier corresponding to the target utterance, a location identifier corresponding to the target utterance, and an attribute corresponding to the target utterance.

15. The non-transitory computer-readable storage medium as recited in claim 6, further storing instructions there on that, when executed by the at least one processor, cause the system to:
    identify a second target utterance in the digital image editing dialogue;
    generate a second ground truth annotation for the second target utterance of the digital image editing dialogue by, based on user interaction with the plurality of image editing annotation elements relative to the second target utterance, determining a frame identifier reflecting a shared topic between the second target utterance and the other digital verbal communications in the digital image editing dialogue, and a ground truth image editing intent corresponding to the second target utterance; and
    add the second target utterance and the second ground truth annotation to the training data set for training an image editing dialogue machine learning model.

16. A system comprising:
    at least one processor; and
    at least one non-transitory computer-readable medium storing instructions that, when executed by the at least one processor, cause the system to:
    in response to a detected selection of an utterance within a digital image editing dialogue within an image editing dialogue annotation user interface, identify the utterance as a target utterance from the digital image editing dialogue, the digital image editing dialogue comprising digital verbal communications from a user for editing a digital image;
    generate a plurality of intent predictions based on the target utterance utilizing an image editing intent classification neural network trained with image editing command annotations;
    provide, for display via an image editing dialogue annotation user interface, the plurality of intent predictions and the target utterance;
    based on user interactions with the plurality of intent predictions and the target utterance, determine a frame identifier reflecting a shared topic between the target utterance and other digital verbal communications in the digital image editing dialogue, and a ground truth image editing intent corresponding to the target utterance;
    determine a speaker associated with the target utterance;
    based on the speaker associated with the target utterance, generate a ground truth annotation for the target utterance including: the frame identifier reflecting the shared topic between the target utterance and other digital verbal communications in the digital image editing dialogue, and the ground truth image editing intent; and
    add the target utterance and the ground truth annotation to a training data set for training a digital image editing dialogue machine learning model to learn co-reference resolution and user intent tracking over multiple conversational turns in a new digital image editing dialogue.

17. The system as recited in claim 16, further storing instructions that, when executed by the at least one processor, cause the system to provide, for display via the image editing dialogue annotation user interface, an open-ended intent control in addition to the plurality of intent predictions.

18. The system as recited in claim 17, further storing instructions that, when executed by the at least one processor, cause the system to, based on receiving text input via the open-ended intent control, modify an annotation ontology associated with the digital image editing dialogue to include an additional pre-defined ontology slot corresponding to the text input.

19. The system as recited in claim 18, further storing instructions that, when executed by the at least one processor, cause the system to further generate the ground truth annotation based on user interactions associated with the one or more image editing annotation elements, wherein the one or more image editing annotation elements are associated with one or more of an object identifier, or a location identifier.

20. The system as recited in claim 19, wherein:
    the training data set comprises a second ground truth annotation corresponding to a second target utterance from the digital image editing dialogue, the second ground truth annotation comprising the frame identifier; and
    the frame identifier reflects the shared topic by comprising at least one of: a common ground truth intent corresponding to both the target utterance and the second target utterance, a common object identifier corresponding to both the target utterance and the second target utterance, or a common location identifier corresponding to both the target utterance and the second target utterance.

* * * * *